US008824016B2

(12) United States Patent
Nishizaki

(10) Patent No.: US 8,824,016 B2
(45) Date of Patent: Sep. 2, 2014

(54) IMAGE PROCESSING DEVICE CAPABLE OF SUPPRESSING DEFORMATION OF PRINTING MEDIUM

(71) Applicant: Takashi Nishizaki, Nagoya (JP)

(72) Inventor: Takashi Nishizaki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/030,118

(22) Filed: Sep. 18, 2013

(65) Prior Publication Data

US 2014/0092441 A1   Apr. 3, 2014

(30) Foreign Application Priority Data

Sep. 28, 2012   (JP) .................................. 2012-218028

(51) Int. Cl.
  *G06K 15/00*   (2006.01)
  *G06K 15/02*   (2006.01)
  *H04N 1/405*   (2006.01)

(52) U.S. Cl.
  CPC ................................. *G06K 15/1881* (2013.01)
  USPC ........... 358/3.06; 358/1.9; 358/518; 358/504; 358/523; 358/520; 382/162

(58) Field of Classification Search
  None
  See application file for complete search history.

(56) References Cited

U.S. PATENT DOCUMENTS

2005/0200868 A1* 9/2005 Yoshida ......................... 358/1.9
2008/0043266 A1* 2/2008 Misumi et al. ................. 358/1.9

FOREIGN PATENT DOCUMENTS

| JP | 2003-051943 A | 2/2003 |
| JP | 2006-224454 A | 8/2006 |
| JP | 2010-119005 A | 5/2010 |

* cited by examiner

*Primary Examiner* — Quang N Vo
(74) *Attorney, Agent, or Firm* — Scully, Scott, Murphy & Presser, PC

(57) ABSTRACT

An image processing device performs: defining determination regions based on image data; executing a first color conversion for the image data using a first type of parameter to generate a first image; determining an estimated amount of colorant for each determination region, the estimated amount indicating an usage amount of colorant to be used for each determination region when the first image is printed; outputting the first image if the estimated amounts of colorant for all determination regions are smaller than or equal to respective threshold values; and executing a second color conversion for the image data using a second type of parameter to generate a second image if the estimated amount of colorant for at least one is greater than the threshold value, the usage amount of colorant for the second image being smaller than the usage amount of colorant for the first image.

11 Claims, 12 Drawing Sheets

FIG. 4A
| | LARGE DOT | MEDIUM DOT | SMALL DOT |
|---|---|---|---|
| WEIGHT | 1.0 | 0.5 | 0.25 |
FIG. 4B
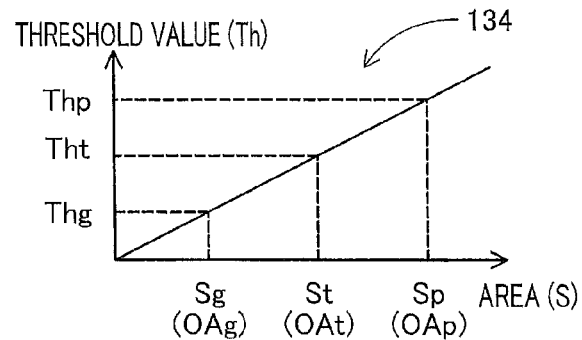
FIG. 5
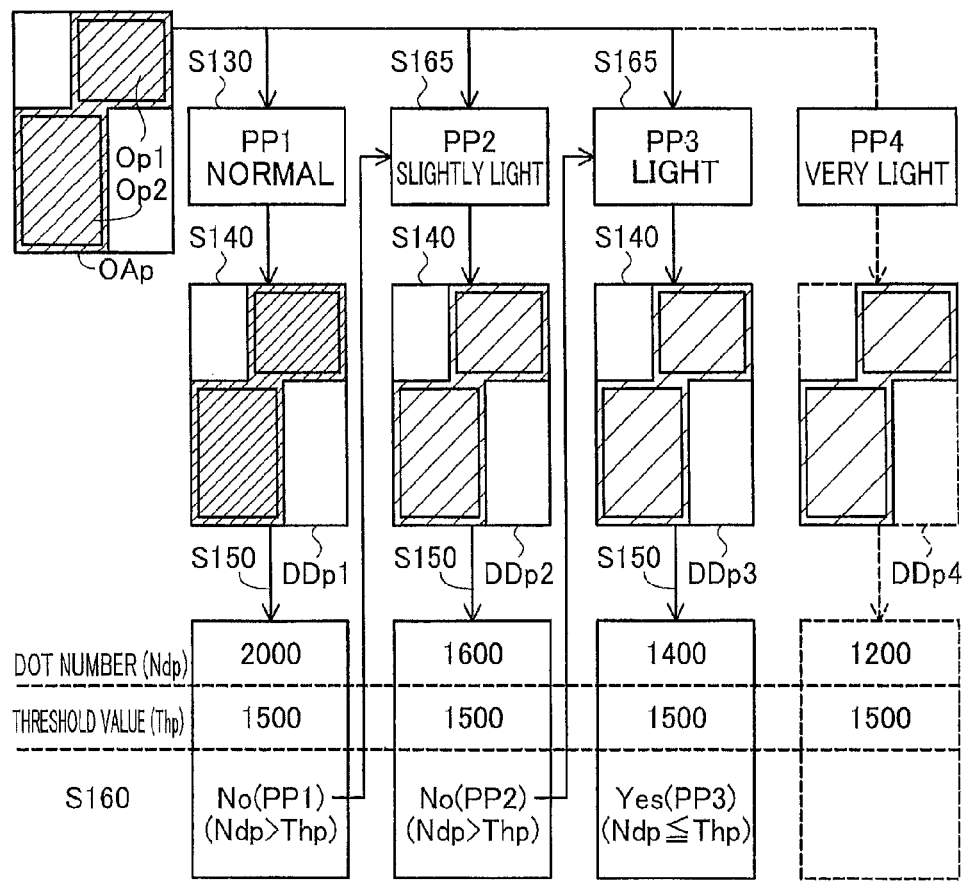

FIRST PROCESS

SECOND OR SUBSEQUENT PROCESS

IMAGE PROCESSING DEVICE CAPABLE OF SUPPRESSING DEFORMATION OF PRINTING MEDIUM

CROSS REFERENCE TO RELATED APPLICATION

This application claims priority from Japanese Patent Application No. 2012-218028 filed Sep. 28, 2012. The entire content of the priority application is incorporated herein by reference.

TECHNICAL FIELD

The present invention relates to an image processing device.

BACKGROUND

Conventionally, a technique for printing an image with the use of a color material such as ink or toner has been utilized. Moreover, various techniques to improve image quality have been proposed. For example, what is proposed is a technique for selecting the number of screen lines of halftone in accordance with attributes such as photograph or text and density of pixels.

SUMMARY

However, the fact of the matter is that much effort has not been made to figure out how to reduce effects of troubles associated with the amount of the color material used. For example, if a large amount of ink is used, a printing medium (e.g. paper) that is in a printing process could be deformed due to curling or cockling. If a large amount of toner is used, the toner might fail to be sufficiently fixed on the recording medium. If small amounts of the color materials are used, a printed image might end up being light.

In view of the foregoing, it is an object of the invention to provide a technique for reducing effects of at least one of the above-described troubles associated with the amount of a color material used.

In order to attain the above and other objects, the invention provides an image processing device including a processor and a memory storing computer-readable instructions therein. The computer-readable instructions, when executed by the processor, causing the image processing device to perform: acquiring image data representing an image; defining a plurality of determination regions in at least part of the image based on the image data; executing, for the at least part of the image, a first color conversion using a first type of parameter to generate a first converted image, the first type of parameter defining relationships between usage amounts of colorant before and after the first color conversion; determining a first estimated amount of colorant for each of the plurality of determination regions in the first converted image, the first estimated amount indicating an usage amount of colorant to be used for each of the plurality of determination regions when the first converted image is printed; judging whether or not a first condition is met, the first condition including that the first estimated amounts of colorant for all of the plurality of determination regions is smaller than or equal to respective threshold values; outputting the first converted image if the first condition is met; and executing, for the at least part of the image, a second color conversion using a second type of parameter to generate a second converted image if a second condition is met, the second condition including that the first condition is not met, the second type of parameter defining relationships between usage amounts of colorant before and after the second color conversion, the usage amount of colorant for the at least part of the image that has been converted through the second color conversion using the second type of parameter being smaller than the usage amount of colorant for the at least part of the image that has been converted through the first color conversion using the first type of parameter.

According to another aspect, the present invention provides a non-transitory computer readable storage medium storing computer-readable instructions, when executed by a processor, causing an image processing device to perform: acquiring image data representing an image; defining a plurality of determination regions in at least part of the image based on the image data; executing, for the at least part of the image, a first color conversion using a first type of parameter to generate a first converted image, the first type of parameter defining relationships between usage amounts of colorant before and after the first color conversion; determining a first estimated amount of colorant for each of the plurality of determination regions in the first converted image, the first estimated amount indicating an usage amount of colorant to be used for each of the plurality of determination regions when the first converted image is printed; judging whether or not a first condition is met, the first condition including that the first estimated amounts of colorant for all of the plurality of determination regions is smaller than or equal to respective threshold values; outputting the first converted image if the first condition is met; and executing, for the at least part of the image, a second color conversion using a second type of parameter to generate a second converted image if a second condition is met, the second condition including that the first condition is not met, the second type of parameter defining relationships between usage amounts of colorant before and after the second color conversion, the usage amount of colorant for the at least part of the image that has been converted through the second color conversion using the second type of parameter being smaller than the usage amount of colorant for the at least part of the image that has been converted through the first color conversion using the first type of parameter.

BRIEF DESCRIPTION OF THE DRAWINGS

The particular features and advantages of the invention as well as other objects will become apparent from the following description taken in connection with the accompanying drawings, in which:

FIG. 4A is a table showing an example of weights for each dot size;

FIG. 4B is a graph showing relationships between threshold values and areas;

FIG. 5 is an explanatory diagram showing how to process the image process of FIG. 2 for a photograph region of an image;

DETAILED DESCRIPTION

A. First Embodiment

Figure 1:
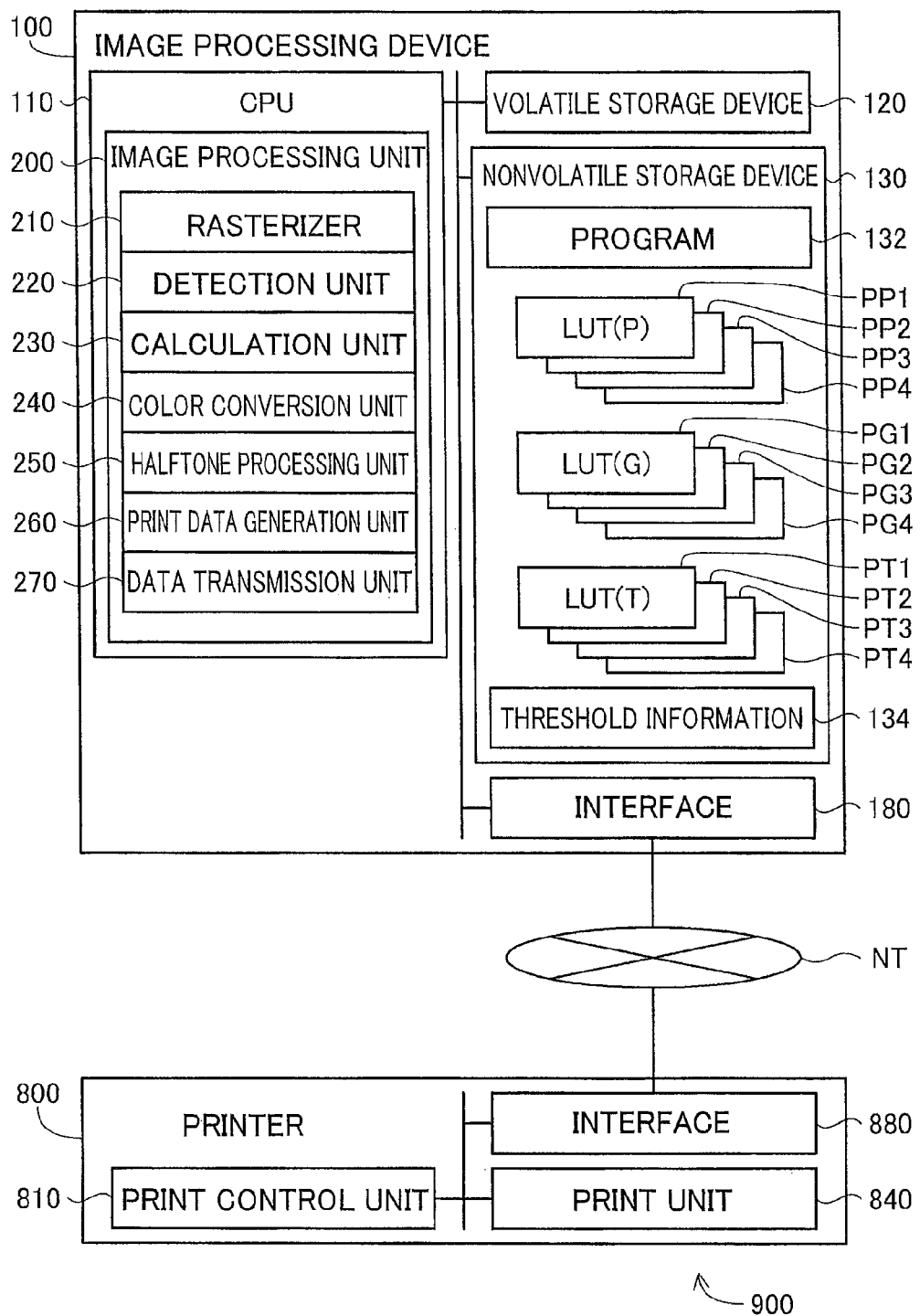
FIG. 1 is a block diagram showing an image processing system including an image processing device according to a first embodiment of the present invention.

FIG. 1 is a block diagram showing an image processing system according to a first embodiment of the present invention. An image processing system 900 includes a network NT, an image processing device 100 and a printer 800. The image processing device 100 and the printer 800 are connected to each other via the network NT.

For example, the image processing device 100 is a general-purpose computer. The image processing device 100 includes a CPU 110 that executes overall control of the image processing device 100; a volatile storage device 120 such as DRAM; a nonvolatile storage device 130 such as flash memory; and an interface 180 (e.g. a network interface or a USB interface) used to communicate with other devices. The network NT is connected to the interface 180.

The nonvolatile storage device 130 stores a program 132, color conversion profiles PP1 to PP4, PG1 to PG4, and PT1 to PT4, and threshold information 134. Hereinafter, the color conversion profiles are also simply referred to as profiles.

The CPU 110 executes the program 132 to function as an image processing unit 200. The image processing unit 200 performs an image process to print an image and generate print data that should be supplied to the printer 800. As shown in FIG. 1, the image processing unit 200 includes a rasterizer 210, a detection unit 220, a calculation unit 230, a color conversion unit 240, a halftone processing unit 250, a print data generation unit 260, and a data transmission unit 270. The functions of the above processing units will be described later.

The printer includes a print control unit 810 that performs overall control of the printer 800; a print unit 840; and an interface 880 (e.g., a network interface or a USB interface) used to communicate with other devices. The network NT is connected to the interface 880. For example, the print unit 840 is a so-called inkjet print device. In the first embodiment, the print unit 840 uses four types of ink (color materials) to print an image; the four types of ink include cyan, magenta, yellow, and black.

For example, the print control unit 810 is formed by using an ASIC (Application Specific Integrated Circuit). The print control unit 810 controls the print unit 840 to print in accordance with print data received via the interface 880.

Figure 2:
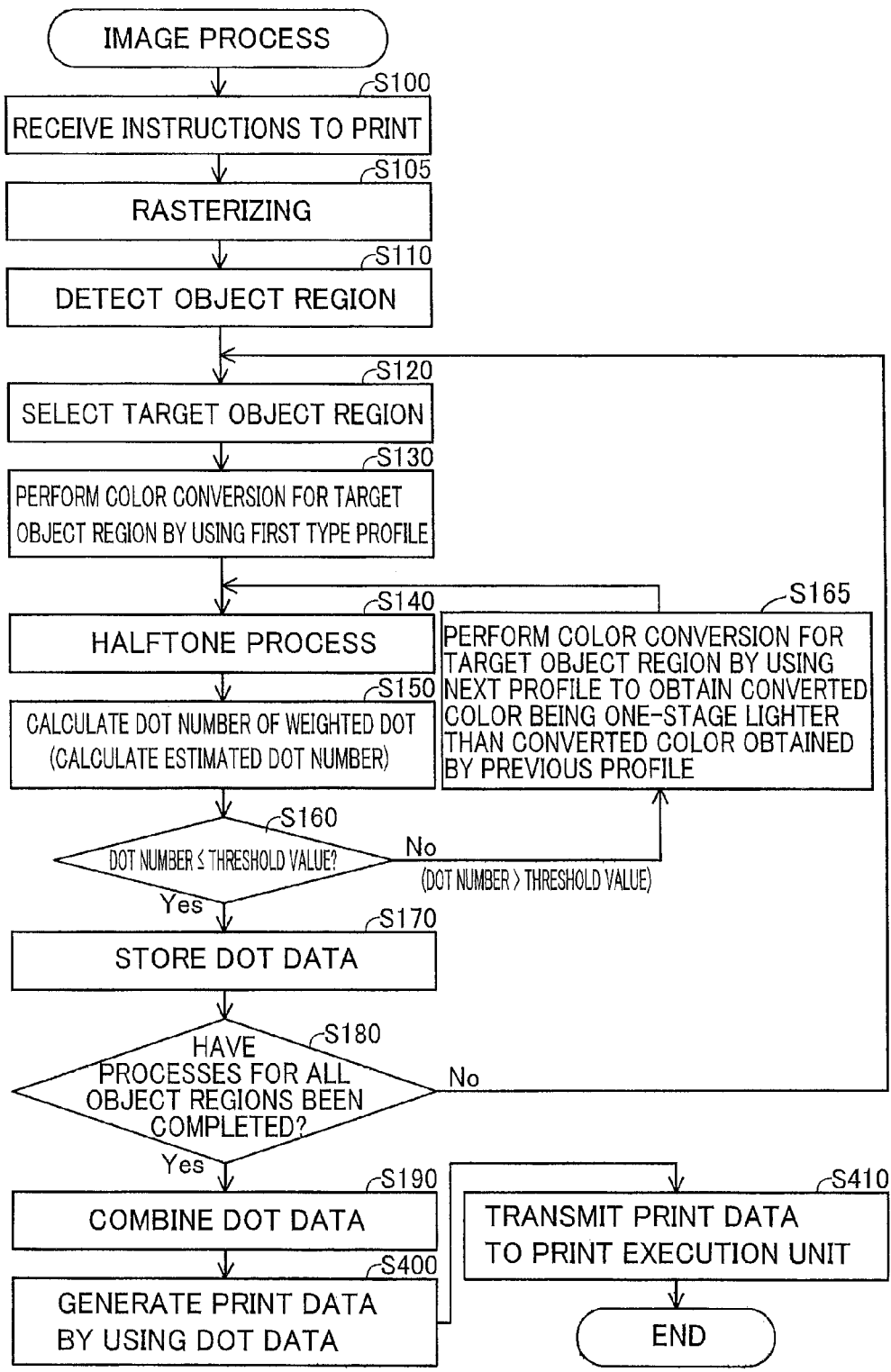
FIG. 2 is a flowchart illustrating steps in an image process executed by the image processing device according to the first embodiment.

FIG. 2 is a flowchart of an image process performed by the image processing unit 200 (FIG. 1). In a beginning step S100 of the image process, the image processing unit 200 receives print instructions from a user. The user's instructions are input into the image processing device 100 via an operation unit not shown (e.g., a mouse or a keyboard). The image processing unit 200 starts the image process shown in FIG. 2 in accordance with the user's instructions.

In the next step S105, the rasterizer 210 (FIG. 1) acquires input image data in accordance with the user's instructions and converts the input image into bitmap data having processing resolution for printing. Hereinafter, the process of converting the input image data to the bitmap data is also referred to as "rasterizing." For example, the input image data is JPEG data or document data, which is specified by a user. Hereinafter, an image represented by the input image data is also referred to as an "input image." For example, in the generated bitmap data, color of each of a plurality of pixels is represented by gradation levels (e.g., 256 gradation levels) of three color components that are red (R), green (G), and blue (B). Hereinafter, pixels expressed in printing-processing resolution are also referred to as processing pixels. The bitmap data is image data that will be subjected to a process of detecting an object region and a color conversion process, which are described later.

In the next step S110, the detection unit 220 analyzes the bitmap data. If an input image represented by the bitmap data includes a plurality of objects that are located at different positions, the detection unit 220 detects a plurality of object regions representing a plurality of objects. The object regions are regions where objects such as texts or photographs are represented. In the first embodiment, the detection unit 220 can detect, as the object region, a text region, a photograph region, and a graphic region. The text region represents a text (or a "character" in other words). The photograph region represents a photograph. The graphic region represents a graphic. Graphics are images drawn by computers, such as illustrations, tables, graphs, diagrams, and patterns.

Figure 3:
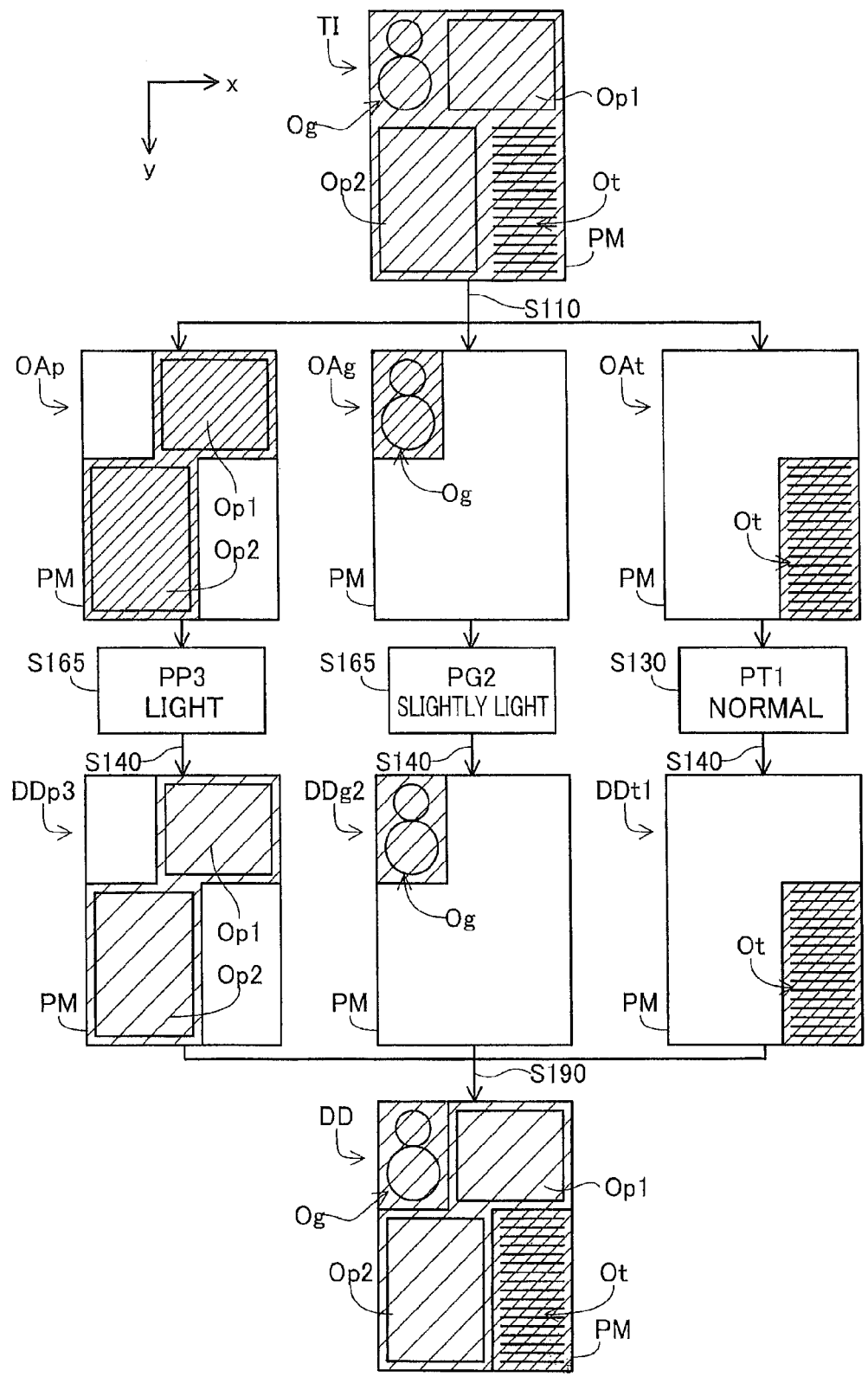
FIG. 3 is an explanatory diagram showing the image process of FIG. 2.

FIG. 3 is a schematic explanatory diagram showing the image process of FIG. 2. In FIG. 3, an image TI represented by bitmap data are shown. The image TI covers almost an entire surface of a printing medium PM (e.g., paper) that is used for printing. In other words, the image TI has a size substantially same as that of the printing medium PM. A plurality of processing pixels representing the image TI are arranged in a first direction x, and in a second direction y perpendicular to the first direction x.

In an example shown in FIG. 3, the image TI represents two photographs Op1 and Op2, and a diagram Og, and a Text Ot. In S110, the detection unit 220 (FIG. 1) detects a photograph region OAp representing the photographs Op1 and Op2; a graphic region OAg representing the diagram Og; and a text region OAt representing the text Ot. As for a method of detecting object regions in such a way as to distinguish between types of the objects as described above, any publicly-known methods can be employed. For example, the following method is available: a method of dividing a to-be-processed image into a plurality of processing regions, calculating the variance of pixel values for each processing region, identifying a processing region whose variance is less than a first threshold value as a text region, recognizing a processing region whose variance is greater than a second threshold value (the second threshold value>the first threshold value) as a photograph region, and identifying a processing region whose variance is greater than or equal to the first threshold value but less than or equal to the second threshold value as a graphic region. For the detection of object regions, not only can variance be used, but other various kinds of information (e.g., color numbers of pixels making up each processing region) can also be used. Moreover, a plurality of kinds of information may be used in combination to detect each of a plurality of types of object regions.

In the next step S120 (FIG. 2), the color conversion unit 240 (FIG. 1) selects, from the detected object regions, one object region for which a color conversion process (S130, S165) and a halftone process (S140) have not yet been completed as a target object region. The color conversion process and halftone process are described later.

In S130, the color conversion unit 240 (FIG. 1) performs color conversion for the target object region. In the first embodiment, for each pixel, gradation levels of red (R), green (G), and blue (B) are converted into gradation levels of a plurality of inks (or gradation levels of cyan (C), magenta (M), yellow (Y), and black (K), in this case). Such a color conversion process between different color spaces is also referred to as color space conversion. The gradation levels of C, M, Y, and K represent the amounts of inks C, M, Y, and K, respectively. Correspondence relationships between RGB and CMYK are defined in advance by color conversion profiles PP1 to PP4, PG1 to PG4, and PT1 to PT4. In other words, profiles define relationships between usage amounts of colorant before and after the color conversion. In the first embodiment, the color conversion profiles are prepared for each type of the objects. Characters "PP" in a reference symbol attached to a color conversion profile mean a color conversion profile for photograph region. Characters "PG" mean a color conversion profile for graphic region. Characters "PT" mean a color conversion profile for text region. Each color conversion profile is so configured as to allow a corresponding type of object to be appropriately printed. For example, the photographic color conversion profiles PP1 to PP4 are so configured as to allow a photograph to be printed in natural colors. The graphic color conversion profiles PG1 to PG4 are so configured as to increase color saturation. The text color conversion profiles PT1 to PT4 are so configured as to increase contrast.

One type of object is associated with four types of color conversion profiles. For example, a photograph is associated with four types of color conversion profiles PP1 to PP4 the color conversion profiles PP1 to PP4 have different output values that are associated with the same input value (In this case, the input values are the gradation levels of RGB, and the output values are the gradation levels of CMYK). Large gradation levels of CMYK mean that the amounts of inks used are large. Therefore, between the color conversion profiles PP1 to PP4, different amounts of inks are used. In the first embodiment, the smaller the reference-symbol number indicates, the higher the gradation levels of CMYK will be after color conversion, i.e. the higher the density of a to-be-printed image will be (In other words, large amounts of inks will be used). In the first embodiment, such differences between gradation levels of CMYK are present across almost the entire regions of RGB. The same is true for the color profiles PG1 to PG4 and PT1 to PT4, which are used for other types of objects (i.e., graphics and texts). Hereinafter, the $i^{th}$ color conversion profiles PPi, PGi, and PTi (i is an integer ranging from 1 to 4) are also referred to as "$i^{th}$ type profiles PPi, PGi, and PTi." If large amounts of inks are used when the $i^{th}$ type profiles are used, the $i+1^{th}$ type profiles may be used to reduce the amounts of inks used.

In S130 in FIG. 2, the color conversion unit 240 uses the first type profiles associated with the type of a target object region to carry out the color conversion for the target object region. The first type profiles are profiles defining the largest usage amounts of inks among that of the four types of profiles. For example, if the target object region is a photograph region OAp, the first type profile PP1 that is associated with a photograph is used in S130.

In the next step S140, the halftone processing unit 250 (FIG. 1) executes a halftone process for each ink by using gradation levels of CMYK obtained by the color conversion of S130. The halftone processing unit executes the halftone process to produce dot data. The dot data represents a dot formation state of each pixel. In the first embodiment, the dot formation state is selected from the following four states: "No dot," "Small dots," "Medium dots," and "Large dots." The terms "Small," "Medium," and "Large" indicate the size of dots. As dots become large in size, the amounts of inks used for formation of the dots increase. In the first embodiment, the halftone process is performed in accordance with a so-called error diffusion method. However, for the halftone process, any other methods (which for example include a method of using a dither matrix) may be employed.

In S150, the calculation unit 230 (FIG. 1) calculates a number of weighted dots within a target object region. In the first embodiment, the number of weighted dots is the total number of dots of all inks, and is the total sum of values obtained by multiplying the number of dots counted for each dot size by a weight that is determined in advance for each dot size.

FIG. 4A is a table showing an example of weights for each dot size. In the first embodiment, the weight for large dots is "1.0"; the weight for medium dots is "0.5"; and the weight for small dots is "0.25." For example, if the number of large dots is "11," and the number of medium dots is 20, and the number of small dots is "16," the number of weighted dots is "25" (i.e. 25=11+0.5*20+0.25*16). The ratio of the weights is almost equal to the ratio of the amounts of inks that are used for formation of dots of each size. The calculated number of weighted dots is equivalent to estimated amounts of inks used for printing of a target object region.

In S160, the color conversion unit 240 (FIG. 1) determines whether or not the dot number of weighted dots is less than or equal to a threshold value. The threshold value is an upper limit for defining an appropriate range of weighted-dot numbers (i.e., estimated amounts of inks used). The color conversion unit 240 references the threshold information 134 to determine a threshold value in accordance with the area of a target object region.

FIG. 4B is a graph showing relationships between threshold values Th and areas S. The horizontal axis represents the area S of a target object region. The vertical axis represents the threshold value Th. In the first embodiment, the number of pixels is used as the area S. As shown in FIG. 4B, as the area S becomes larger, the threshold value Th increases. The correspondence between the area S and the threshold value Th is defined by the threshold information 134 (FIG. 1). Incidentally, various values representing the size of a target object region may be employed as the area S. For example, the area of a region where a target object region is printed (expressed in square centimeters) may be employed.

FIG. 4B shows areas Sp, St, and Sg of the three object regions OAp, OAt, and OAg, and respective threshold values Thp, Tht, and Thg. In the example shown in FIG. 4B, Sp>St>Sg. Therefore, Thp>Tht>Thg. That is, as the area S of an object region becomes larger, the threshold value Th of the object region becomes larger.

If the dot number of weighted dots is greater than a threshold value (S160: No), the color conversion unit 240 in S165 uses a next profile to perform the color conversion of the target object region again. The next profile can convert a color of the target object region into a converted color being one-stage lighter than a converted color obtained by the color conversion using the previous profile of the target object region. For example, if the first type profile PP1 is used in the previous color conversion process, the second type profile PP2 is used to execute the color conversion of the target object region again. In general, if the $i^{th}$ type profile is used in the previous color conversion process, the $i+1^{th}$ type profile is used to carry out the color conversion of the target object region again.

The gradation levels of CMYK that are determined in S165 can be smaller than the gradation levels that were determined in the previous color conversion process. After color conversion is performed again, the process proceeds to step S140 again. Then, in accordance with the latest gradation levels determined in step S165, steps S140, S150, and S160 are performed. The number of weighted dots calculated in step S150 can be smaller than the number of weighted dots that was previously calculated. Accordingly, the determination result of step S160 may be "Yes." If the determination result of step S160 based on the latest number of weighted dots is "No," the processes of steps S165, S140, S150, and S160 are performed again. Incidentally, in step S165, a profile associated with the type of a target object region is used.

FIG. 5 is a schematic diagram showing an example of how to process a photograph region OAp. In the case of FIG. 5, the first type profile PP1 is used for color conversion in S130. In S140, the halftone process is performed to generate dot data DDp1. In S150, the number Ndp of weighted dots is calculated. The calculated number Ndp of weighted dots is "2,000"; the threshold value Thp is "1,500." Accordingly, the determination result of step S160 is "No."

In the subsequent step S165, the second type profile PP2, which defines output values one-stage lighter than that defined by the first type profile PP1, is used. Then, the halftone process (S140) is carried out to generate dot data DDp2, and the number Ndp of weighted dots is calculated (S150). The calculated number Ndp of weighted dots is "1,600," which is smaller than the previous value "2,000." However, that value (i.e. "1,600") is larger than the threshold value Thp. Accordingly, the determination result of step S160 is "No."

In the subsequent step S165, the third type profile PP3, which is one-stage lighter than the second type profile PP2, is used. Then, the halftone process (S140) is performed to generate dot data DDp3, and the number Ndp of weighted dots is calculated (S150). The calculated number Ndp of weighted dots is "1,400," which is smaller than the previous value "1,600." Moreover, that value (i.e. "1,400") is less than or equal to the threshold value Thp. Accordingly, the determination result of step S160 is "Yes."

If the determination result of step S160 is still "No" even after the third type profile PP3 is used, the fourth type profile PP4, which can produce an image having one-stage lighter than the image produced using the third type profile PP3, is used. As shown in FIG. 5, if the fourth type profile PP4 is used, a further smaller weighted-dot number, "1,200," is calculated from updated dot data DDp4. If the lightest fourth type profile PP4 is used, the process will proceed in the same way as the case where the determination result of step S160 is "Yes" even if the number Ndp of weighted dots is greater than the threshold value Thp.

If the number of weighted dots is less than or equal to the threshold value (FIG. 2: S160: Yes), in S170 the halftone processing unit 250 (FIG. 1) outputs the latest dot data generated in S140 and stores the latest dot data in the volatile storage device 120.

In S180, the color conversion unit 240 determines whether or not the processes for all object regions have been completed. If there are still object regions to process (S180: No), the color conversion unit 240 brings the process back to step S120. If the processes of all the object regions have been finished (S180: Yes), the color conversion unit 240 allows the process to proceed to step S190.

FIG. 3 shows an example of how to process each of the object regions OAp, OAg, and OAt. As for the photograph region OAp, as illustrated in FIG. 5, dot data DDp3 is generated (S140) on the basis of results of color conversion (S165) that uses the third type profile PP3. As for the graphic region OAg, dot data DDg2 is generated (S140) on the basis of results of color conversion (S165) that uses the second type profile PG2. As for the text region OAt, dot data DDt1 is generated (S140) on the basis of results of color conversion (S130) that uses the first type profile PT1.

In the next step S190 in FIG. 2, the halftone processing unit 250 combines and synthesizes dot data of each object region to generate dot data that represents an entire image. In the example shown in FIG. 3, dot data DDp3, DDg2, and DDt1 of the three object regions OAp, OAg, and OAt are combined to generate dot data DD that represents an entire image.

In the next step S400 in FIG. 2, the print data generation unit 260 generates print data by using the dot data. The print data is data representing results of the halftone process. The print data is in a format that can be interpreted by the printer 800 (print control unit 810). In S410, the data transmission unit 270 transmits the print data to the printer 800. The printer 800 prints an image in accordance with the received print data.

As described above, the image processing device 1 according to the first embodiment uses a profile whose weighted-dot number (or estimated usage amount of inks, in other words) does not exceed a threshold value among a plurality of kinds of profiles that include the first type profiles PP1, PG1, and PT1 and the second type profiles PP2, PG2, and PT2, which can reduce the usage amounts of inks more than the first type profiles PP1, PG1, and PT1. Therefore, it is possible to reduce effects of troubles associated with the amounts of inks used. For example, deformation of a printing medium during printing process can be suppressed: the deformation might occur due to large amounts of inks used. Thus, a printing medium can be kept from coming in contact with a print head (not shown) unintentionally. Moreover, position deviation of dots on a printing medium can be curbed. Moreover, appropriate printing can be realized, even if a process of adjusting a printing speed depending on a to-be-printed image is not employed in order to dry ink. Furthermore, a color conversion profile is selected for each object region, thereby realizing appropriate color conversion for each object region. For example, the possibility of feeling uncomfortable can be reduced, such as when some areas of an object region are printed lightly.

The number of weighted dots (estimated usage amounts of inks) used to determine whether or not a first type profile is employed is calculated based on results of color conversion using the first type profile (FIG. 2: S130, S140, and S150). Accordingly, the accuracy of estimating the usage amounts of inks for use of the first type profile can be improved. Therefore, effects of troubles associated with the amounts of used inks can be further reduced.

When the number of weighted dots calculated based on results of color conversion using a first type profile is greater than a threshold value, and when the number of weighted dots calculated based on results of color conversion using a second type profile is less than or equal to the threshold value, the second type profile is employed (S165, S140, S150, and S160 in FIG. 2). Therefore, compared with a case where the second type profile is used unconditionally, a printed image is prevented from becoming too light in color. Moreover, the number of weighted dots (estimated amounts of inks used) used to determine whether or not the second type profile is employed is calculated based on results of color conversion using the second type profile (FIG. 2: S165, S140, and S150). Accordingly, the accuracy of estimating the amounts of inks used for use of the second type profile can be improved. Therefore, effects of troubles associated with the amounts of inks used can be further reduced.

In particular, the estimated usage amounts of inks are calculated on the basis of the number of dots represented by a dot formation state determined by the halftone process (FIG. 2: S150). Therefore, the accuracy of estimating the amounts of inks used can be improved. As a result, effects of troubles associated with the amounts of inks used can be further reduced. Moreover, the number of weighted dots obtained by using a weight (FIG. 4A) associated with each of three types of dots having different dot sizes is used as the estimated amount of ink used. Therefore, when the three types of dots are used for printing, an appropriately estimated usage amount of ink can be calculated. As a result, effects of troubles associated with the amounts of inks used can be further reduced.

As shown in FIG. 4B, the threshold value Th increases as the area S of a target object region becomes larger. In this manner, the threshold values suitable for various areas S of a target object region are used. Therefore, it is possible to further reduce effects of troubles associated with the usage amounts of inks when various images are printed.

As shown in FIG. 1, the first to fourth type profiles that are different in the amounts of inks used are prepared for each type of an object region (i.e., for each type of an object). For color conversion of a target object region, a profile associated with the type of the target object region is used (FIG. 2: S130 and S165). In this manner, a profile suited for the type of an object region is used. Therefore, when various images are printed, effects of troubles associated with the amounts of inks used can be further reduced. Moreover, the same profile is used for the same type of target object region including a plurality of object regions. Therefore, the possibility of feeling uncomfortable can be reduced, such as when only some of the plurality of objects is printed lightly.

B. Second Embodiment

Figure 6:
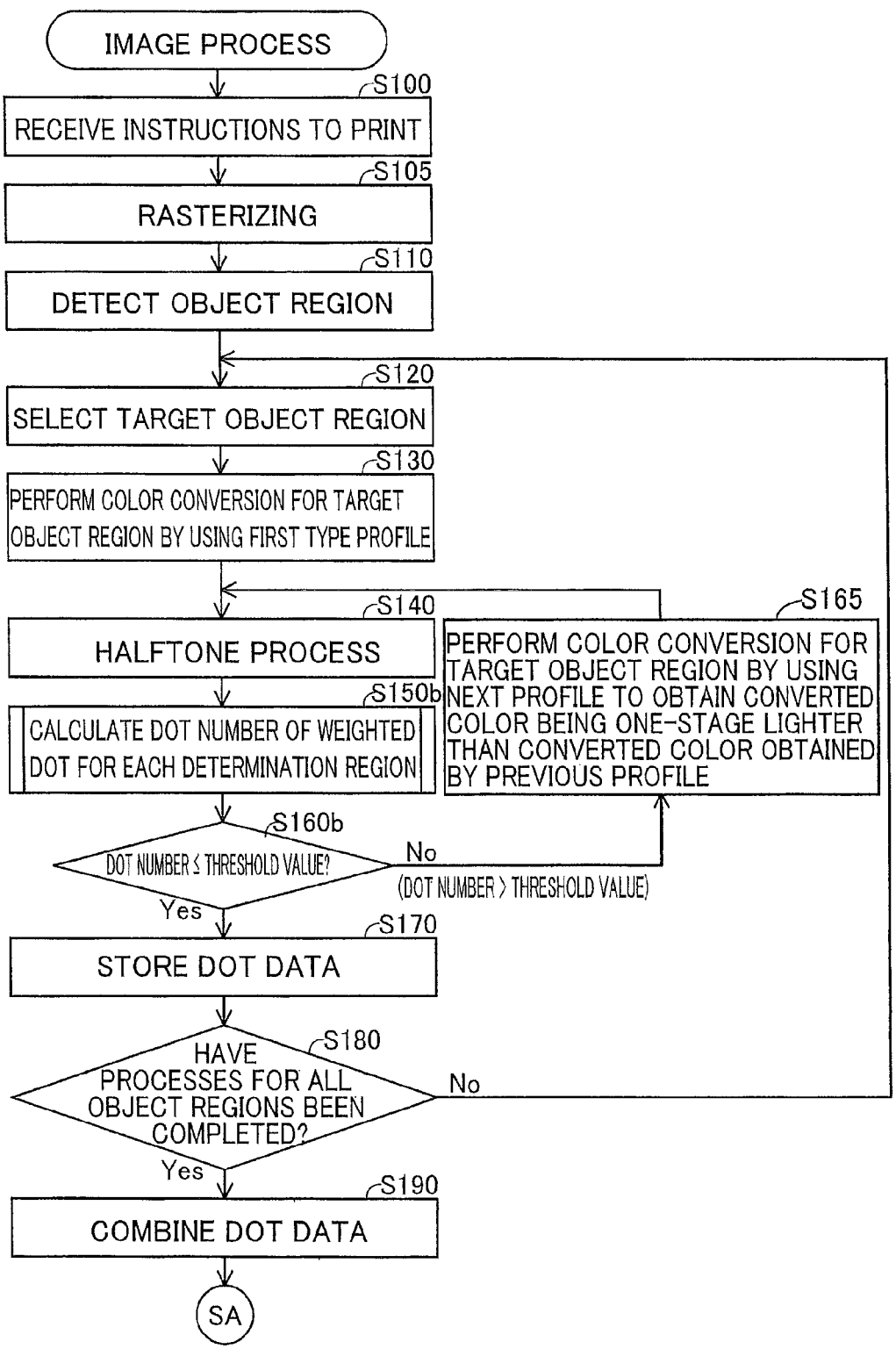
FIGS. 6 and 7 are a flowchart illustrating steps in an image process executed by an image processing device according to a second embodiment of the present invention.
Figure 7:
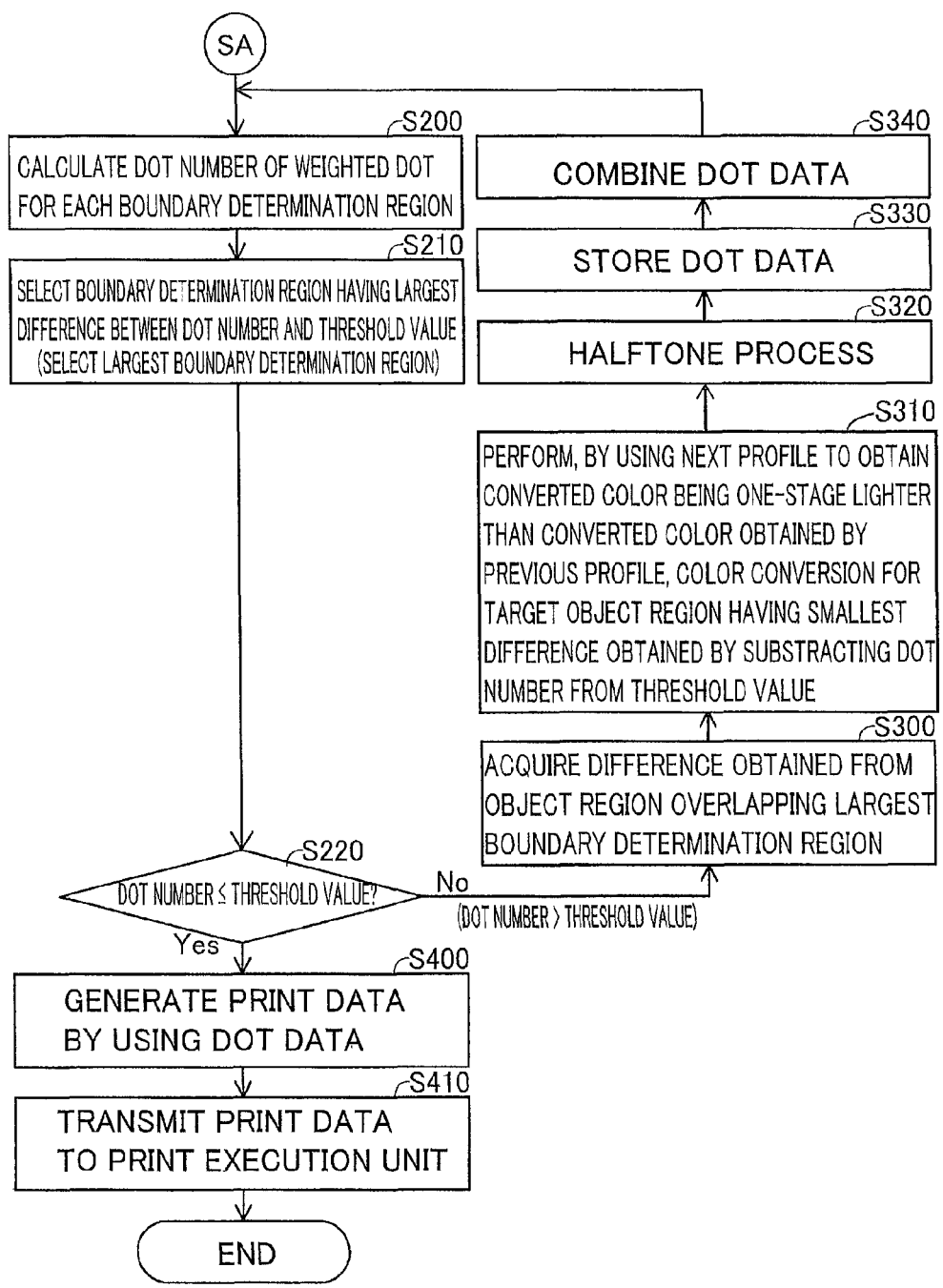

FIGS. 6 and 7 are flowcharts of another example of the image process. Incidentally, FIG. 7 shows the rest of a process shown in FIG. 6. The second embodiment is different from the first embodiment shown in FIG. 2 in that the process of calculating a weighted-dot number and the process of comparing with a threshold value are modified (FIG. 6: 150b) (FIG. 6: 160b), and in that a process for a boundary portion between a plurality of object regions is added (FIG. 7: S200 to S220, and S300 to S340). In the second embodiment, a plurality of determination regions are disposed on a target object region, and the number of weighted dots is calculated for each determination region, and a profile is selected based on the calculated number of weighted dots. In FIGS. 6 and 7, the same steps as those of FIG. 2 are represented by the same reference numerals, and will not be described. The hardware configuration of an image processing system according to the second embodiment is the same as the hardware configuration of the image processing system 900 (FIG. 1) according to the first embodiment. In the following description of the second embodiment, the image processing unit 200 of FIG. 1 carries out the processes of FIGS. 6 and 7. Incidentally, the color conversion profiles are the same as those in the first embodiment; threshold information is different from the threshold information 134 of FIG. 4B (which will be detailed later).

The processes of steps S100 to S140 are the same as in the first embodiment shown in FIG. 2. In next step S150b, the number of weighted dots is calculated for each determination region.

Figure 8:
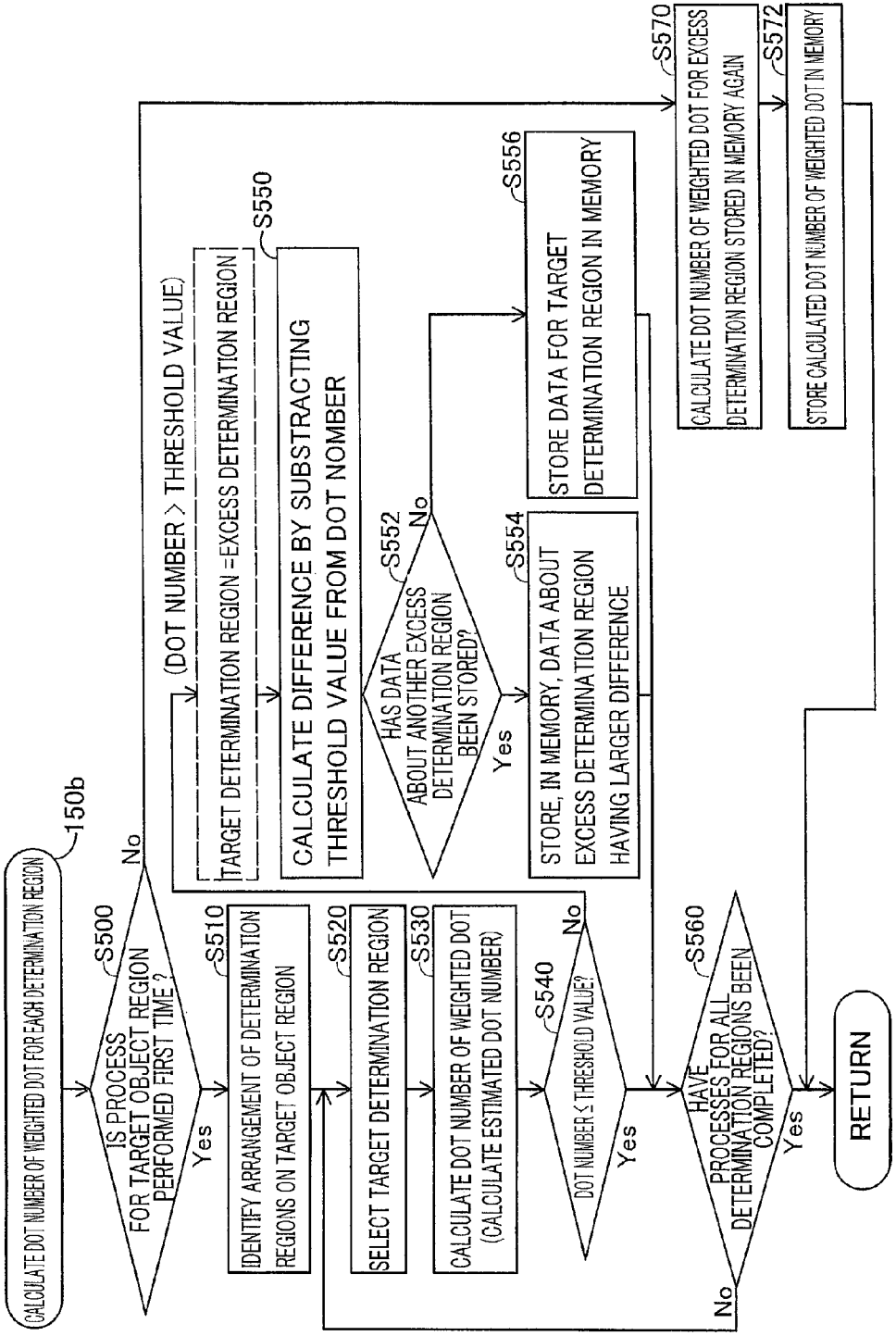
FIG. 8 is a flowchart illustrating steps in S150b of FIG. 6.

FIG. 8 is a flowchart illustrating calculation of the number of weighted dots for each determination region of S150b. In the first step S500, the color conversion unit 240 makes a determination as to whether or not the process of FIG. 8 will be performed for the first time for a target object region. If the current process is the first to be performed (S500: Yes), the color conversion unit 240 in S510 identifies the arrangement of determination regions on a target object region.

Figure 9A:
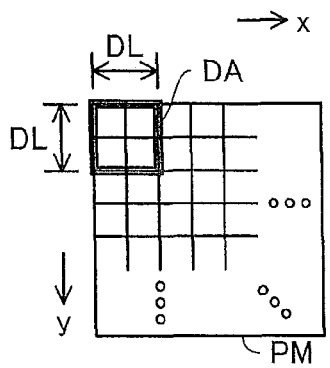
FIGS. 9A-9E is explanatory diagrams showing how to set determination regions in the second embodiment.
Figure 9B:
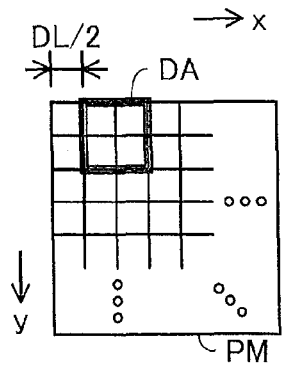
Figure 9C:
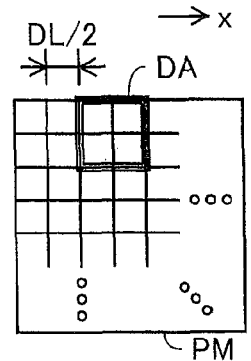
Figure 9D:
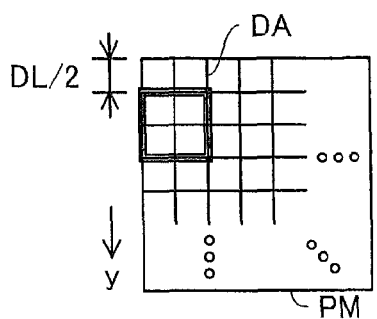
Figure 9E:
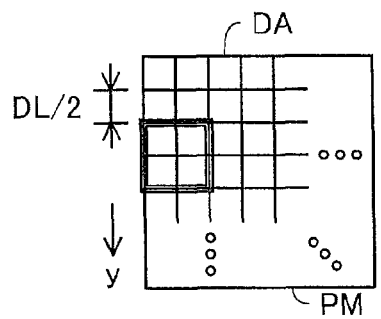

FIGS. 9A-9E are schematic diagrams showing determination regions. A plurality of determination regions DA is evenly disposed on a printed medium PM. In each of FIGS. 9A to 9E, one different determination region DA is indicated by double line. In the second embodiment, one determination region DA is in a square shape. In the diagram, the length DL represents the length of one side of one determination region DA. One determination region DA contains a plurality of pixels (not shown). As shown in FIGS. 9A to 9C, a plurality of determination regions DA are disposed along a first direction x such that each determination region DA overlaps with half of an adjacent determination region DA in the first direction x. As shown in FIGS. 9A, 9D, and 9E, a plurality of determination regions DA are disposed along a second direction y such that each determination region DA overlaps with half of an adjacent determination region DA in the second direction y. In this manner, the plurality of determination regions DA is disposed at different positions. The positions of determination regions DA on the printing medium PM are determined in advance.

In S510 of FIG. 8, the color conversion unit 240 identifies the positions of determination regions DA on a target object region on the basis of the position of the target object region on the printed medium PM. Incidentally, as for a determination region DA located in an end portion of the target object region, only a portion of the determination region DA might be the target object region. It can be said that such a determination region, too, is disposed on the target object region. In general, it can be said that a determination region containing a target object region is disposed on the target object region.

In S520 in FIG. 8, the color conversion unit 240 selects, from among one or more determination regions containing a target object region, one determination region for which the number of weighted dots has not yet been calculated, as a target determination region. In S530, the calculation unit 230 (FIG. 1) calculates the number of weighted dots in the target determination region. The calculation method is the same as that of step S150 in FIG. 2.

In S540, the color conversion unit 240 (FIG. 1) makes a determination as to whether or not the number of weighted dots is smaller than or equal to a threshold value. Unlike the first embodiment, the color conversion unit 240 references threshold information 134b to determine a threshold value corresponding to the position of the determination region.

Figure 10A:
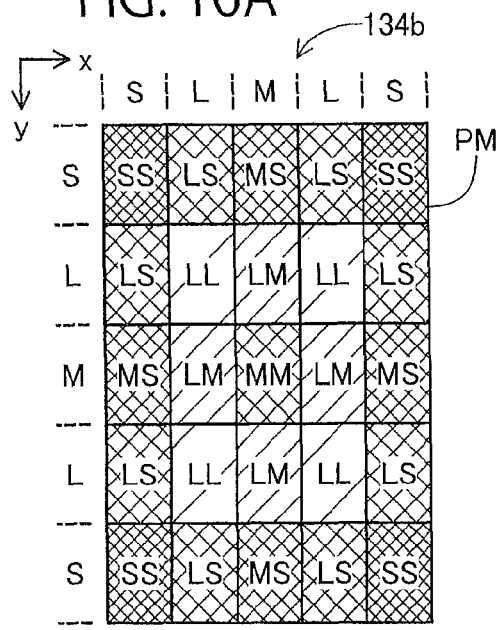
FIG. 10A is an explanatory diagram showing partial regions defined in a printing medium in the second embodiment.
Figure 10B:
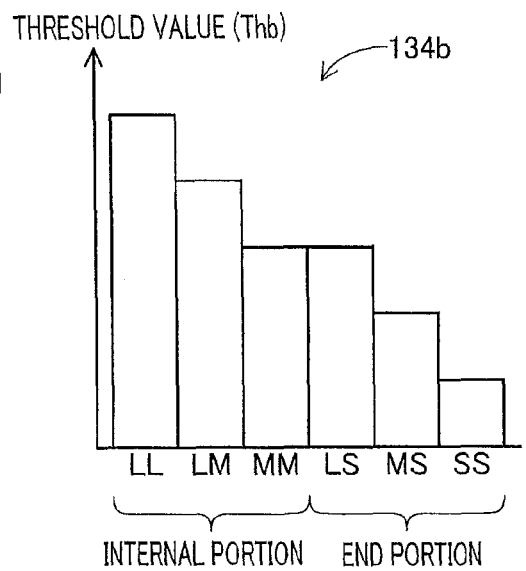
FIG. 10B is a graph showing relationships between threshold values and types of partial regions used in the second embodiment.

FIGS. 10A and 10B are schematic diagrams of the threshold information 134b of the second embodiment. FIG. 10A is a schematic diagram showing 25 partial regions obtained by dividing the printing medium PM. FIG. 10B is a graph showing correspondence between the types of partial regions and the threshold value Thb.

As shown in FIG. 10A, the printing medium PM is divided into five sections along the first direction x, and into five sections in the second direction y. The five sections of the first direction x are classified, from one end to the other end, into: "S," "L," "M," "L," and "S." As described later, the "S" indicates a small threshold value, and the "M" indicates a medium threshold value, and the "L" indicates a large threshold value. Similarly, the five sections of the second direction y are classified, from one end to the other end, into: "S," "L," "M," "L," and "S." The 25 partial regions are classified into the following six types that are obtained by the first direction x's classification and the second direction y's classification: "SS," "MS," "LS," "MM," "LM," and "LL."

FIG. 10B shows correspondence between the six classifications and the threshold value Thb. As shown in the diagram, the ascending order of the threshold value Thb is: "SS," "MS," "LS," "MM," "LM," and "LL." Relatively small threshold values Thb are associated with the three types "SS," "SM," and "SL," which contains "S"; if the threshold values Thb of the three types are arranged in ascending order, "SS," "SM," and "SL." If a focus is put on letters on the other sides that are combined with "S," the ascending order of the threshold value Thb is: "S," "M," and "L." Relatively large threshold values Thb are associated with the two types "LL" and "LM," which contains "L"; if the threshold values Thb of the two types are arranged in descending order, "LL" and "LM." A medium threshold value Thb is associated with the type "MM." Incidentally, in the example shown in FIG. 10B, the threshold value Thb of the type "MM" is the same as the threshold value Thb of the type "LS."

As shown in FIGS. 10A and 10B, relatively small threshold values Thb are associated with partial regions that are located in an end portion of the printing medium PM. Relatively large threshold values Thb are associated with partial regions that are located in an internal portion of the printing medium PM away from the end portion. The reason is that the end portion of the printing medium PM can be more easily deformed in the process of being printed than the internal portion. Smaller threshold values Thb are associated with partial regions that are relatively easy to deform than the threshold values Thb for partial regions that are relatively difficult to deform. Therefore, amounts of inks used that are dependent on how easily the printing medium is deformed can be realized (which will be detailed later).

If the number of weighted dots is smaller than or equal to the corresponding threshold value (FIG. 8: S540: Yes), the color conversion unit 240 (FIG. 1) in S560 makes a determination as to whether or not all the determination regions have been processed. If there are still unprocessed determination regions (S560: No), the color conversion unit 240 brings the process back to step S520. If all the determination regions have been processed (S560: Yes), the color conversion unit 240 ends the processes of FIG. 8 and proceeds to step S160b of FIG. 6.

If the number of weighted dots is greater than the threshold value (FIG. 8: S540: No), the color conversion unit 240 (FIG. 1) determines that the target determination region is an excess determination region, and the color conversion unit 240 in S550 calculates a difference by subtracting the threshold value from the number of weighted dots. In this case, the excess determination region is a determination region where the number of weighted dots is greater than the threshold value. The color conversion unit 240 then carries out the subsequent processes of steps S552, S554, and S556 to store, in the nonvolatile storage device 130, identification information and difference of a determination region having the largest difference among differences of the plurality of determination regions containing the target object region.

More specifically, in S552 the color conversion unit 240 determines whether or not the volatile storage device 120 has stored data about another excess determination region that is different from a target determination region. The data is the identification information for identifying the determination region and a difference thereof. If the data about another excess determination region is stored in the volatile storage device 120 (S552: Yes), the color conversion unit 240 in S554 stores, in the nonvolatile storage device 130, data about a determination region having a larger difference, i.e. already-stored data about another excess determination region or data about the target determination region. If the data about another excess determination region is not stored in the volatile storage device 120 (S552: No), the color conversion unit 240 in S556 stores, in the nonvolatile storage device 130, the data about the target determination region. After steps S554 and S556 are completed, the process proceeds to step S560.

Figure 11A:
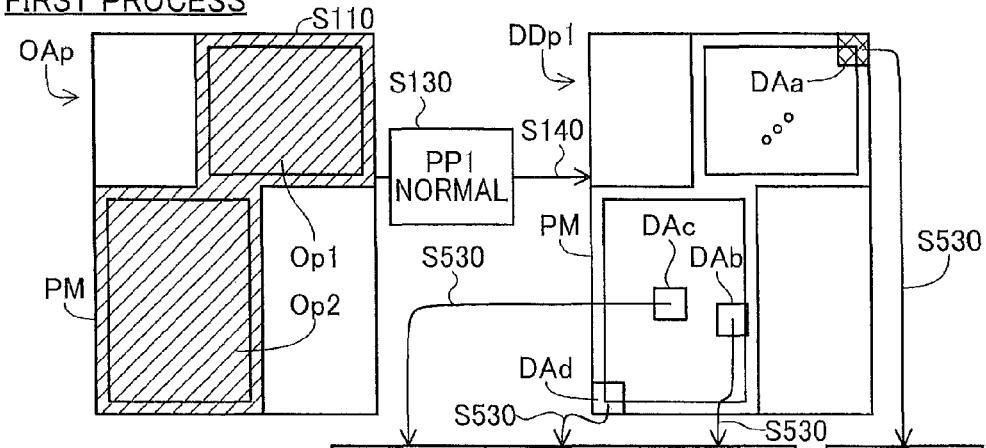
FIGS. 11A and 11B are explanatory diagrams showing how to process the image process of FIGS. 6 and 7 in the second embodiment.
Figure 11B:
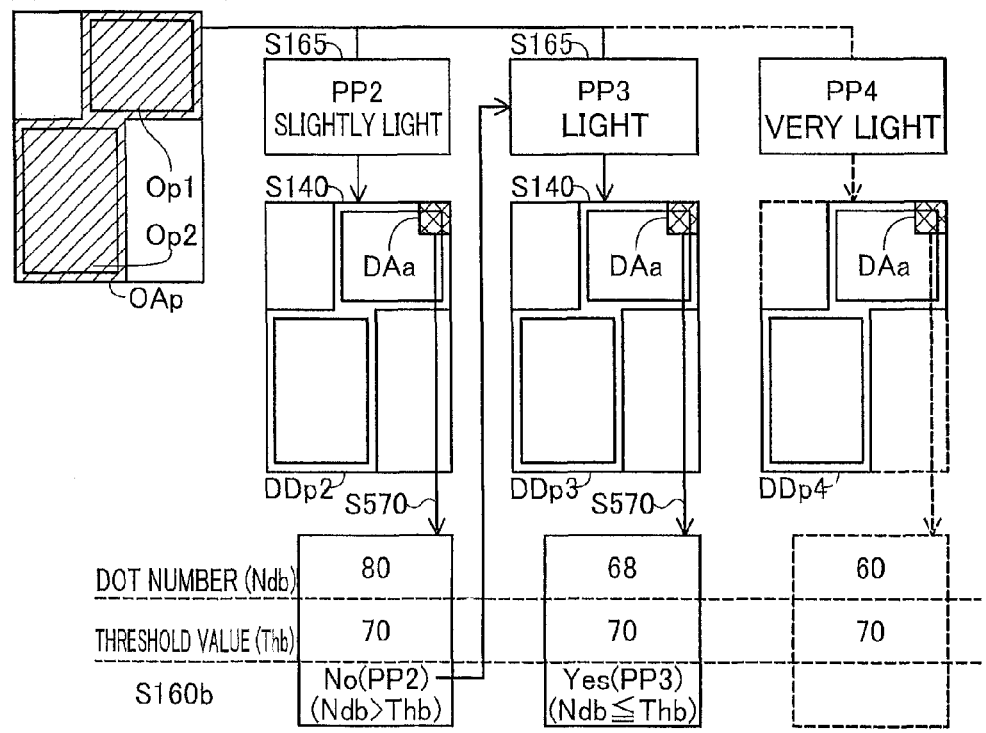

FIGS. 11A and 11B are schematic diagrams showing examples of how to process the photograph region OAp. FIG. 11A shows an example of calculating the number of weighted dots for the first time. In S110, the photograph region OAp is detected. In step S130, the first type profile PP1 is used to carry out color conversion. In step S140, the halftone process is carried out to generate dot data DDp1. FIG. 11A shows four determination regions DAa, DAb, DAc, and DAd of a plurality of determination regions containing the photograph region OAp. In S530, the number Ndb of weighted dots of each determination region is calculated. In S540, the threshold value Thb associated with the position of the determination region is compared with the number Ndb of weighted dots. In the example shown in FIG. 11A, the first determination region DAa is the determination region having the largest difference among the plurality of determination regions each containing a part of the photograph region OAp. Accordingly, after the processes of FIG. 8 are finished, the nonvolatile storage device 130 has stored the data containing the identification information and difference of the first determination region DAa therein.

In S160b in FIG. 6, the color conversion unit 240 determines whether or not the dot number of weighted dots of all determination regions each containing a part of the target object region is less than or equal to the threshold value. If the data about an excess determination region is not stored in the nonvolatile storage device 130, the determination result is "Yes." In this case, the color conversion unit 240 proceeds to step S170. Steps S170, 180, and 190 are the same as steps S170, 180, and 190 in FIG. 2.

If the data about an excess determination region that is stored in the nonvolatile storage device 130 indicates that the number of weighted dots is greater than the threshold value, the determination result of step S160b is "No." In this case, in S165 a profile that is one-stage lighter is used to carry out color conversion. Then, steps S140, S150b, and S160b are performed again. Incidentally, step S165 is the same as step S165 in FIG. 2.

The second and subsequent processes of S150b will be described. If step S150b is executed for the second or more times for a target object region, the determination result of S500 of FIG. 8 is "No." In step S570, the calculation unit 230 (FIG. 1) calculates the number of weighted dots again for an excess determination region that is already stored in the nonvolatile storage device 130. Unlike the first process, the number of weighted dots is not calculated for another determination region containing a target object region. In the next step S572, the color conversion unit 240 calculates a difference by subtracting a threshold value from the calculated number of weighted dots, and stores the calculated difference (or updated difference) in the nonvolatile storage device 130. Then, in S160b of FIG. 6, the color conversion unit 240 determines whether or not the updated difference is smaller than or equal to the threshold value. In this manner, during the second and subsequent processes, only the determination region where the difference is the largest during the first process is used. If the updated data of the determination region having the largest difference during the first process indicates that the number of weighted dots is less than or equal to the threshold value, the possibility is high that the number of weighted dots in other determination regions, too, is less than or equal to the threshold value. Thus, while reducing a processing load, a profile by which an estimated usage amount of ink for the target object region does not exceed the threshold value can be selected.

FIG. 11B shows an example of calculating the number of weighted dots during the second or subsequent process. In S165, the second type profile PP2, which is one-stage lighter than the first type profile PP1, is used. Then, the halftone process (S140) is executed to generate dot data DDp2. In S570, the number Ndb of weighted dots of the first determination region DAa having the largest difference is calculated again with the use of the dot data DDp2. The calculated number Ndb of weighted dots is "80," which is smaller than the previous "90." However, the number of dot weighted dots (i.e. "80") is larger than the threshold value Thb; the determination result of S160b therefore is "No."

In the subsequent step S165, the third type profile PP3, which is one-stage lighter than the second type profile PP2, is used. Then, the halftone process (S14) is carried out to generate dot data DDp3, and the number Ndb of weighted dots is calculated (S570). The calculated number Ndb of weighted dots is "68," which is smaller than the previous "80." Moreover, that value (i.e., "68") is less than or equal to the threshold value Thb; the determination result of step S160b therefore is "Yes."

If the determination result of S160b is still "No" even after the third type profile PP3 is used, the fourth type profile PP4, which is one-stage lighter than the third type profile PP3, is used. As shown in FIG. 11B, if the fourth type profile PP4 is used, a further smaller weighted-dot number, "60," is calculated from updated dot data DDp4. If the lightest fourth type profile PP4 is used, the process will proceed in the same way as the case where the determination result of step S160b is "Yes" even if the number Ndp of weighted dots is greater than the threshold value.

If the determination result of S160b of FIG. 6 is "Yes," as in the case of the example shown in FIG. 2, the processes of steps S170, S180, and S190 are carried out in that order. In S200 to S340 (FIG. 7), which come after step S190, a boundary portion between a plurality of object regions is processed. In S200, the calculation unit 230 calculates the number of weighted dots for each boundary determination region. The boundary determination region is a determination region containing some portions of two or more object regions. The number of weighted dots is calculated in this process so as to include all dots within the boundary determination region. In S210, the color conversion unit 240 selects a boundary determination region having the largest difference, which is calculated by subtracting from the number of weighted dots the threshold value (Hereinafter, the boundary determination region is referred to as "largest boundary determination region."). In S220, the color conversion unit 240 makes a determination as to whether or not the number of weighted dots for the largest boundary determination region is less than or equal to the threshold value.

Figure 12:
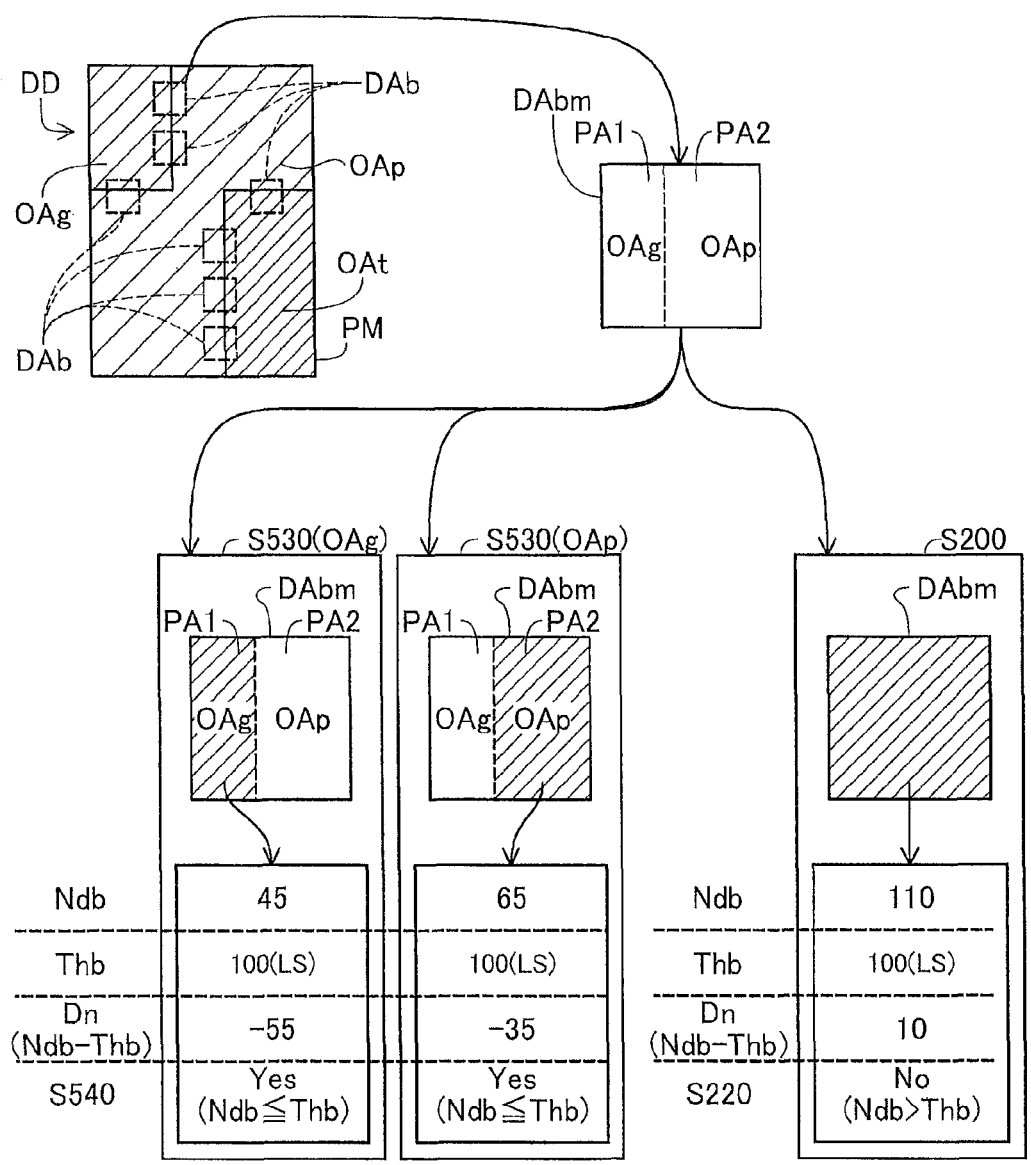
FIG. 12 is an explanatory diagram showing an example of calculating a number of weighted dots for a maximum boundary determination region in the image process according to the second embodiment.

FIG. 12 is a schematic diagram showing an example of calculating the number of weighted dots for a maximum boundary determination region. Dot data DD generated in step S190 of FIG. 6 and a plurality of boundary determination regions Dab are shown in FIG. 12. For example, the boundary determination regions DAb include: a determination region containing the graphic region OAg and the photograph region OAp; and a determination region containing the photograph region OAp and the text region OAt. The diagram provides an enlarged view of a largest boundary determination region DAbm, among the plurality of boundary determination regions DAb. The largest boundary determination region DAbm includes a first portion PA1 representing the graphic region OAg, and a second portion PA2 representing the photograph region OAp. In the diagram, as for the largest boundary determination region DAbm, an example of performing steps S530 and S540 (FIG. 8), and an example of carrying out steps S200 to S220 (FIG. 7) are shown. As for the example of performing steps S530 and S540, a processing example in which the target object region is the graphic region OAg; and a processing example in which the target object region is the photograph region OAp are shown.

As for one boundary determination region, even if the number of weighted dots is less than or equal to a threshold value in S540 (FIG. 8), the number of weighted dots might exceed the threshold value in step S220 (FIG. 7). The reason is as follows. In the process of step S530 (FIG. 8), only dots of a target object region are counted for the number of weighted dots. That is, the number of weighted dots is calculated from some area of a boundary determination region. Meanwhile, in the process of step S200 (FIG. 7), the number of weighted dots is calculated from the entire boundary determination region. For example, as shown in step S530 of FIG. 12, if the target object region is the graphic region OAg, the number Ndb of weighted dots is calculated from the first portion PA1; the calculated number Ndb of weighted dots is "45." The calculated number Ndb of weighted dots "45" for the first portion PA1 is less than the threshold value Thb "100." If the target object region is the photograph region OAp, the number Ndb of weighted dots is calculated from the second portion PA2; the calculated number Ndb of weighted dots is "65." The calculated number Ndb of weighted dots "65" for the second portion PA2 is less than the threshold value Thb "100." However, in S200 the number Ndb of weighted dots is calculated from the entire boundary determination region DAbm; the resulting number Ndb "110" is greater than the threshold value Thb "100."

If the determination result of step S220 of FIG. 7 is "No," the color conversion unit 240 in the next step S300 acquires, for each of a plurality of object regions contained in the largest boundary determination region, a difference that is obtained from a determination region containing each object.

Figure 13:
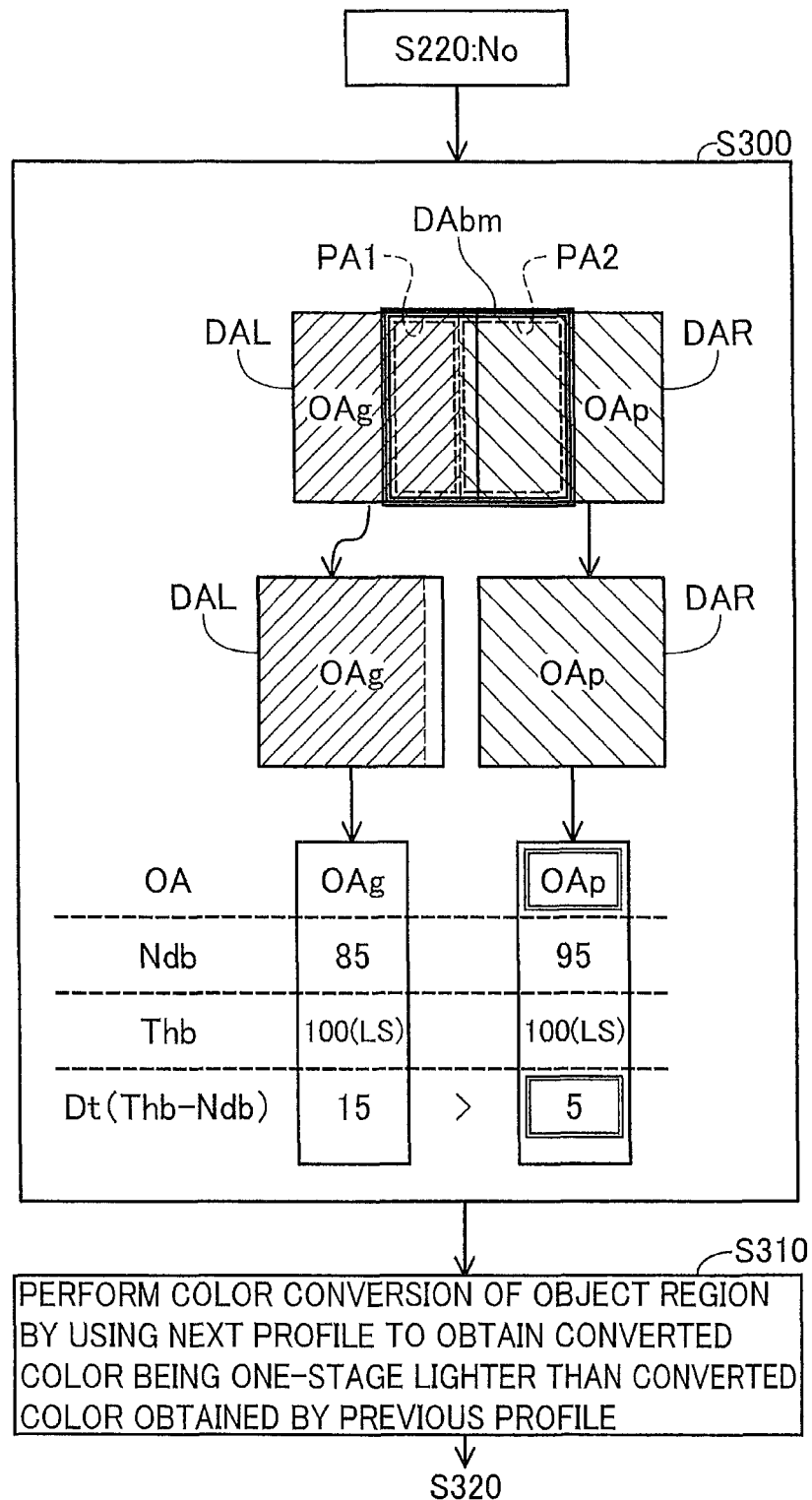
FIG. 13 is an explanatory diagram showing a process in S300 of FIG. 7.

FIG. 13 is a schematic diagram showing a processing example of step S300. What is shown is an example of a process pertaining to the largest boundary determination region DAbm, which is described in FIG. 12. In FIG. 13, the largest boundary determination region DAbm is indicated by double line; a first portion PA1 and a second portion PA2 by broken line; and two determination regions DAL and DAR, which partially overlap with the largest boundary determination region DAbm, by single line; and a portion of a graphic region OAg and a portion of a photograph region OAp by different kinds of hatching. The largest boundary determination region DAbm includes the portion of the graphic region OAg that contains the first portion PA1, and the portion of the photograph region OAp that contains the second portion PA2. Therefore, the color conversion unit 240 acquires a difference that is calculated from a determination region DAL containing the graphic region OAg, and a difference that is calculated from a determination region DAR containing the photograph region OAp.

First, the color conversion unit 240 selects a determination region of each of a plurality of object regions whose part is contained in the largest boundary determination region. In the second embodiment, one or more determination regions are selected among a plurality of determination regions that partially overlap with the largest boundary determination region. An area ratio of an object region within the selected determination region is larger than the area ratio of the object region within the largest boundary determination region. In the example shown in FIG. 13, the first determination region DAL that partially overlaps with the largest boundary determination region DAbm is selected as a determination region for the graphic region OAg. The area ratio of the graphic region OAg in the first determination region DAL is larger than the area ratio of the graphic region OAg within the largest boundary determination region DAbm. The second determination region DAR that partially overlaps with the largest boundary determination region DAbm is selected as a determination region for the photograph region OAp. The area ratio of the photograph region OAp in the second determination region DAR is larger than the area ratio of the photograph region OAp within the largest boundary determination region DAbm.

Then, the calculation unit 230 calculates the number Ndb of weighted dots for each of determination regions selected. For the calculation, dots in an object region that is inside a determination region and for which a difference will be calculated are used. For example, in the example shown in FIG. 13, dots in the graphic region OAg that is inside the first determination region DAL are used in order to calculate the number Ndb of weighted dots for the graphic region OAg. Dots in the photograph region OAp that is inside the second determination region DAR are used in order to calculate the number Ndb of weighted dots for the photograph region OAp. The color conversion unit 240 calculates, for each of the first determination region DAR and second determination region DAL, difference by subtracting the number of weighted dots from the corresponding threshold value (FIGS. 10A and 10B).

In the next step S310 in FIG. 7, the color conversion unit 240 performs color conversion for an object region having the smallest difference that is calculated in S300 by using a profile that is one-stage lighter than a profile that is previously used for color conversion. The smallest difference means that a margin of an estimated amount of ink used for a corresponding threshold value is the smallest. The color conversion unit 240 performs color conversion of an object region having the smallest margin of the estimated amount of ink used by using a profile that is one-stage lighter. In the example shown in FIG. 13, the difference Dt of the graphic region OAg is "15"; the difference Dt of the photograph region OAp is "5." Therefore, the object region having the smallest difference Dt is the photograph region OAp. Accordingly, the color conversion unit 240 performs in S310 the color conversion for the photograph region OAp using a profile that is one-stage lighter.

The subsequent steps S320, S330, and S340 in FIG. 7 are the same as steps S140, S170, and S190 in FIG. 6, respectively. That is, dot data is generated in accordance with results of color conversion in S310. After the dot data is generated, the process returns to S200. Then, steps S200 to S220, and steps S300 to S340 are repeated until the determination result of step S220 becomes "Yes." After the determination result of step S220 becomes "Yes," the process proceeds to step S400.

Incidentally, if an object region that will be subjected to color conversion in S310 has already been subjected to color conversion with the use of the lightest profile, the process proceeds to step S400 as in the case where the determination result of step S220 is "Yes."

Steps S400 and S410 are the same as steps S400 and S410 in FIG. 2, respectively. Therefore, print data is transmitted to the printer 800. The printer 800 prints an image in accordance with the received print data.

As described above, a profile is selected for each object region in the second embodiment as in the case of the first embodiment. Therefore, various advantageous effects can be achieved as in the case of the first embodiment.

In the second embodiment, when an estimated usage amount of ink is less than a threshold value in all of a plurality of determination regions DA (FIG. 9) that are disposed on a target object region, the first type profiles PP1, PG1, and PT1 are used to carry out color conversion of the target object region (i.e., when the determination result of step S160b in FIG. 6 that is performed for the first time is "Yes"). In this case, the estimated usage amount of ink is the number of weighted dots calculated by using the first type profiles PP1, PG1, and PT1 (which is referred to as "first estimated usage amount," hereinafter). If there are at least one of the plurality of the determination regions whose first estimated usage amount is greater than the corresponding threshold value, and if prescribed conditions described below are satisfied, the second type profiles PP2, PG2, and PT2 are used to carry out color conversion of the target object region (i.e., when the determination result of step S160b in FIG. 6 that is performed for the second time is "Yes"). In this manner, when the first estimated usage amount is greater than the threshold value, and when prescribed conditions are satisfied, the second type profiles PP2, PG2, and PT2, which use smaller amounts of inks than the first type profiles PP1, PG1, and PT1, are used. Therefore, effects of troubles associated with the amounts of inks used can be reduced. Moreover, the first estimated usage amount is calculated by using results of color conversion of the target object region that uses the first type profiles PP1, PG1, and PT1. Therefore, the accuracy of estimating the amounts of inks used can be improved.

The prescribed conditions for using the second type profiles PP2, PG2, and PT2 for color conversion are as follows. That is, if the first estimated usage amount for at least one of the plurality of determination regions in the target object region is greater than the corresponding threshold value, the second type profiles PP2, PG2, and PT2 are used in steps S165, S140, and S150b in FIG. 6 to calculate the estimated usage amount of ink for an excess determination region. Incidentally, the estimated usage amount of ink for an excess determination region that is calculated using the second type profiles PP2, PG2, and PT2 is also referred to as "second estimated usage amount." If the second estimated usage amount for the excess determination region is less than or equal to the threshold value, the second type profiles PP2, PG2, and PT2 are used to carry out color conversion of a target object region (That is, when the determination result of step S160b in FIG. 6 that is performed for the second time is "Yes.") In this manner, when the second estimated usage amount does not exceed the threshold value, the second type profiles PP2, PG2, and PT2 are used. Therefore, effects of troubles associated with the amounts of inks used can be reduced. Moreover, the second estimated usage amount is calculated by using results of color conversion of the target object region that uses the second type profiles PP2, PG2, and PT2. Therefore, the accuracy of estimating the amounts of inks used can be improved.

Moreover, the second estimated usage amount is calculated for only one determination region, that is, one excess determination region where the difference (i.e., the first estimated usage amount minus the threshold value) is the largest (FIG. 8: S570, S572; referred to as "calculation determination region," hereinafter). Only that one calculation determination region is used to make a determination as to whether or not the second estimated usage amount is less than or equal to a threshold value. Thus, while reducing a processing load, effects of troubles associated with the amounts of inks used can be appropriately reduced. Incidentally, the calculation determination region is selected from a plurality of determination regions disposed on the target object region. If a plurality of object regions is detected, a different calculation determination region is selected for each object region.

Moreover, as shown in FIGS. 10A and 10B, the threshold value Thb is determined in accordance with the position of the determination region (e.g., the position on the printing medium PM). Therefore, it is possible to use the threshold value Thb suitable for the position of the determination region. Accordingly, effects of troubles associated with the amounts of inks used can be reduced. In particular, in the second embodiment, the threshold value corresponding to at least part of a determination region that should be printed in the end portion of the printing medium PM is smaller than that corresponding to at least part of a determination region that should be printed in the internal portion of the printing medium PM away from the end portion. Therefore, the usage amount of ink in the end portion can be curbed even if the end portion of the printing medium PM can be more easily deformed than in the internal portion. Therefore, effects of troubles associated with the amounts of inks used can be further reduced. Incidentally, the relationship between the magnitude of the threshold value Thb and the position within the printing medium PM is not limited to those shown in FIGS. 10A and 10B. Any relationship may be employed, such as those by which the threshold value Thb becomes smaller in areas that can be more easily deformed in the process of being printed. The same threshold value may be used for all determination regions.

Further, the plurality of determination regions are so disposed as to partially overlap with other determination regions. Accordingly, the appropriate comparison of an estimated usage amount for each determination region with a threshold value can be realized in finer resolution than the size of one determination region. Therefore, effects of troubles associated with the usage amounts of inks can be further reduced. Incidentally, a plurality of determination regions may be so disposed as not to overlap with each other. The shape of one determination region is not limited to a square shape; any other shapes (e.g., an oblong shape (or more generally, a rectangular shape), and a substantially circular shape) may be employed.

Further, if it is determined that the number of weighted dots of a boundary determination region is greater than a threshold value in S220 in FIG. 7, the color conversion for one of the plurality of object regions contained in the boundary determination region is carried out with a profile that is one-stage lighter. Accordingly, it is possible to reduce effects of troubles associated with the usage amounts of inks when a plurality of object regions are detected and when an estimated amount of ink used in a boundary portion between the plurality of object regions is greater than a threshold value. In particular, in the second embodiment, among a plurality of object regions contained in a boundary determination region, an object region having the smallest difference (i.e., the threshold value minus the number of weighted dots) calculated for each object region is subjected to color conversion with the use of a profile that is one-stage lighter. Therefore, compared with a case where other object regions are color-converted with the one-stage lighter profile, a printed image can be kept from becoming too light in color. Moreover, as described in FIG. 13, a determination region selected for calculating a difference (i.e., the threshold value minus the number of weighted dots) of each object region is a determination region whose area ratio of an object region within the determination region among determination regions partially overlapping with the boundary determination region is larger than that of the boundary determination region. Therefore, it is possible to calculate a difference (i.e., the threshold value minus the number of weighted dots) that is suitable for each of a plurality of object regions.

C. Third Embodiment

Figure 14:
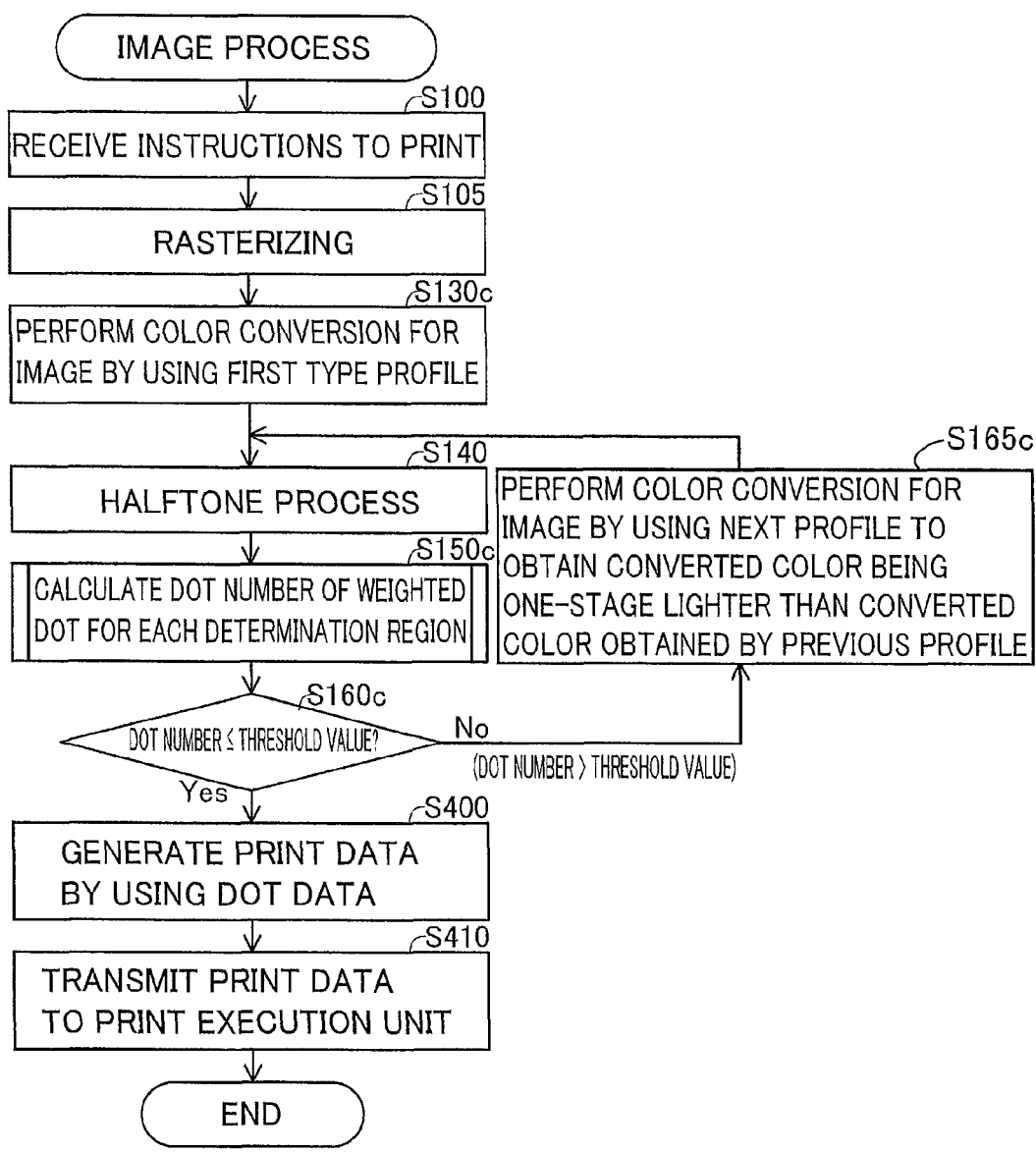
FIG. 14 is a flowchart illustrating steps in an image process executed by an image processing device according to a third embodiment of the present invention.

FIG. 14 is a flowchart showing an image process according to a third embodiment of the present invention. The third embodiment is different from the second embodiment shown in FIGS. 6 and 7 in that: the process of detecting an object region (FIG. 6: S110), and the processes associated with the detection of an object region (FIG. 6: S120, S170 to S220, and S300 to S340) are omitted; and that one color conversion profile that is selected in accordance with the number of weighted dots calculated for each determination region is applied to an entire input image represented by input image data. In FIG. 14 the same steps as those in FIGS. 6 and 7 are represented by the same reference symbols, and will not be described. The hardware configuration of an image processing system used in the third embodiment is the same as the hardware configuration of the image processing system 900 (FIG. 1) of the first embodiment. In the following description of the third embodiment, suppose that the image processing unit 200 of FIG. 1 carries out the processes of FIG. 14. However, in the third embodiment, the detection unit 220 is omitted. As for color conversion profiles, unlike the first embodiment, first type to fourth type profiles are prepared independently of the types of objects, and are used (not shown). If the profiles are arranged in the order that smaller amounts of inks are used: the first type profile, the second type profile, the third type profile, and the fourth type profile. As for threshold information, threshold information 134b shown in FIG. 10 is used.

The processes of steps S100 and S105 are the same as those of steps S100 and S105 in FIG. 6. In S130c which comes after step S105, the color conversion unit 240 (FIG. 1) uses the first type profile to carry out color conversion of an entire input image. The next step S140 is the same as step S140 in FIG. 6: the halftone process is performed to generate dot data.

The process of the next step S150c is the same as a process that is created by replacing the "target object region" in the process of FIG. 8 with the "input image." That is, in the first process, a plurality of determination regions is disposed across the entire input image (S510). The dot number of weighted dots is calculated for each determination region (S530). Then, a determination for each determination region is, based on the threshold value Thb shown in FIG. 10, made as to whether or not the number of weighted dots is less than or equal to the threshold value Thb (S540). The identification information and difference of an excess determination region having the largest difference are stored in the nonvolatile storage device 130 (S552, S554, and S556). In the second and subsequent processes, the data of an excess determination region that has the largest difference during the first process is updated (S570 and S572).

In S160c in FIG. 14 the color conversion unit 240 determines whether the number of weighted dots is less than or equal to the threshold value in all the determination regions disposed on the input image. The determination method is the same as that of step S160b of FIG. 6. If the determination result is "Yes," the process proceeds to step S400. If the determination result is "No," the color conversion unit 240 in the next step S165c uses the one-stage lighter profile to perform the color conversion for the entire input image. Then, the processes of steps S140, S150c, and S160c are performed again. Incidentally, if the lightest profile is used, the process will proceed in the same way as the case where the determination result of step S160c is "Yes" even if the number of weighted dots is greater than the threshold value.

If the determination result of step S160c is "Yes," steps S400 and S410 are executed. As a result, print data is transmitted to the printer 800. The printer 800 prints an image in accordance with the received print data.

As described above, a profile for an input image is determined in the third embodiment similarly to the profile of each object region in the second embodiment. More specifically, a profile used for color conversion is selected on the basis of an estimated amount of ink used for each of a plurality of determination regions disposed on the input image. Therefore, various advantageous effects can be achieved as in the case of the second embodiment.

While the invention has been described in detail with reference to the first to third embodiments thereof, it would be apparent to those skilled in the art that various changes and modifications may be made therein without departing from the spirit of the invention.

D. Modifications (1) The number of types of a plurality of kinds of profiles that are different in the amounts of inks used is not limited to 4; K types can be employed. K is an integer greater than and equal to 2. Color ranges that are different in the amounts of inks used may include at least part of ranges of input values (e.g., gradation values of R, G, and B); the color ranges may be almost the entire ranges (e.g., the remaining entire ranges except for the brightest white), or may be some ranges.

(2) The detection unit 220 may detect the plurality of object regions of the same kind that are separated from one another (For example, two separate photograph regions may be detected). Even in this case, the color conversion unit 240 can select a profile for each object region.

(3) In S310 in FIG. 7, the color conversion unit 240 may use the one-stage lighter profile to perform the color conversion for each of all the object regions contained in the largest boundary determination region. In this case, step S300 can be omitted.

(4) The total number of dot sizes is not limited to three. Any number can be employed. For example, four dot sizes may be employed: "Small Dot, Medium Dot, Large Dot, and Extra-large Dot." As for the total number of dot sizes, "1" may be employed. In this case, as an estimated amount of ink used, a simple dot-number can be employed.

(5) The usage estimated amount of ink is not limited to the number of dots; various values that are correlated with an amount of ink used can be employed. For example, the sum of gradation values of each ink (e.g., gradation values of C, M, Y, and K) may be employed as an estimated amount of ink used.

(6) In the examples shown in FIG. 2 and FIGS. 6 to 8, the color conversion unit 240 may use a common color conversion profile regardless of the type of an object. The detection unit 220 may not identify the type of an object, and may detect a plurality of object regions representing a plurality of objects that are located at different positions.

(7) In each of the above examples, a humidity sensor may be provided in the printer 800; the color conversion unit 240 may acquire humidity from the humidity sensor, and adjust the threshold value depending on the humidity in such a way that the threshold value becomes smaller as the humidity increases. Therefore, if a printing medium PM can be easily deformed at higher humidity, effects of troubles associated with the amounts of inks used can be reduced. Moreover, the color conversion unit 240 may adjust the threshold value in accordance with a fiber direction of a printing medium PM. Accordingly, when the fiber direction can change how easily the printing medium PM is deformed, it is possible to reduce effects of troubles associated with the usage amounts of inks. Incidentally, the color conversion unit 240 may recognize the fiber direction of the printing medium PM on the basis of information input by the user.

(8) The image process for printing is not limited to those shown in FIGS. 2, 6, 7, 8, and 14; various processes may be employed. For example, in the case of the flowchart shown in FIG. 8, the second and subsequent processes may be carried out in the same way as the first process. In this case, steps S500, S570, and S572 are omitted.

(9) The print unit 840 is not limited to an inkjet type printing device; various printing devices that print an image with the use of a color material can be employed. For example, a laser printer that uses toner as a color material may be employed as the print unit 840. The color materials are not limited to four materials CMYK; any type of, and any number of, color materials can be employed.

(10) A parameter selected in accordance with an estimated usage amount of a color material (colorant) is not limited to a color conversion profile; various parameters by which an amount of a color material used is determined (or, in other words, which control an amount of a color material used) can be employed. For example, a parameter used in a halftone process may be employed. If the method of the halftone process is a method using a dither matrix, the halftone processing unit 250 can select a dither matrix used for the halftone process from among a plurality of kinds of dither matrixes that are different in the amount of a color material used. If the method of the halftone process is a so-called error diffusion method, a parameter used in a process of the error diffusion may be employed. For example, the halftone processing unit 250 can select a dot gradation value from among a plurality of different values. The dot gradation value is a gradation value associated with a dot formation state. Specifically, the dot gradation value is a gradation value that is subtracted from an accumulated gradation value in accordance with a dot formation state during the error calculation process. Incidentally, as for a method of selecting a dither matrix or a dot gradation value, the same method used for selection of a profile in each of the above examples can be employed. The halftone process is a process of converting ink gradation values into multiple values representing a dot formation state. Accordingly, the halftone process is one type of color conversion. That is, it can be said that the halftone processing unit 250 is one type of a color conversion unit.

(11) The functions of the image processing unit 200 (FIG. 1) may be realized not only by a general-purpose computer, but also by various devices (e.g., a combined machine having a computer and a printer unit, a digital camera, a scanner, a personal computer, and a portable terminal). Each of a plurality of devices (e.g., a plurality of computers) that can communicate with each other via a network may play a role in realizing the functions of the image processing unit 200, and the devices as a whole may provide the functions of the image processing unit 200. Incidentally, a system including a plurality of the devices works as an image processing device.

In each of the above examples, part of the configuration realized by hardware may be replaced with software; or part or all of the configuration realized by software may be replaced with hardware. For example, the functions of the image processing unit 200 shown in FIG. 1 may be realized by a dedicated hardware circuit having logic circuits.

If some or all of the functions of the present invention are realized by a computer program, the program may be stored in a computer-readable recording medium (e.g., a recording medium that is not temporary), and the recording medium may be offered. The program may be used in the situation where the program remains stored in the same recording medium that is offered, or is stored in a different recording medium (e.g., a computer-readable recording medium). The "computer-readable recording media" are not limited to portable recording media, such as memory cards or CD-ROM, but include internal storage devices in computers, such as various kinds of ROM, and external storage devices connected to computers, such as hard disk drives.

What is claimed is:

1. An image processing device comprising:
   a processor; and
   a memory storing computer-readable instructions therein, the computer-readable instructions, when executed by the processor, causing the image processing device to perform:
   acquiring image data representing an image;
   defining a plurality of determination regions in at least part of the image based on the image data;
   executing, for the at least part of the image, a first color conversion using a first type of parameter to generate a first converted image, the first type of parameter defining relationships between usage amounts of colorant before and after the first color conversion;
   determining a first estimated amount of colorant for each of the plurality of determination regions in the first converted image, the first estimated amount indicating an usage amount of colorant to be used for each of the plurality of determination regions when the first converted image is printed;
   judging whether or not a first condition is met, the first condition including that the first estimated amounts of colorant for all of the plurality of determination regions is smaller than or equal to respective threshold values;
   outputting the first converted image if the first condition is met; and
   executing, for the at least part of the image, a second color conversion using a second type of parameter to generate a second converted image if a second condition is met, the second condition including that the first condition is not met, the second type of parameter defining relationships between usage amounts of colorant before and after the second color conversion, the usage amount of colorant for the at least part of the image that has been converted through the second color conversion using the second type of parameter being smaller than the usage amount of colorant for the at least part of the image that has been converted through the first color conversion using the first type of parameter.

2. The image processing device according to claim 1, wherein the plurality of determination regions includes a first determination region and a second determination region different from the first determination region;
   wherein the first determination region corresponds to a first threshold value and the second determination region corresponds to a second threshold value different from the first threshold value.

3. The image processing device according to claim 2, wherein the first determination region is to be printed on an end portion of a recording medium;
   wherein the second determination region is to be printed on an internal portion of the recording medium away from the end portion;
   wherein the first threshold value is smaller than the second threshold value.

4. The image processing device according to claim 1, wherein the computer-readable instructions, when executed by the processor, causes the image processing device to further perform:
   detecting a first object region and a second object region from the image, the first object region and the second object region being at different positions from each other, the first object region representing a first object, the second object representing a second object different from the first object;
   determining a second estimated amount of colorant for a boundary determination region, the boundary determination region being a determination region in which at least part of the first object region and at least part of the second object region are contained, the second estimated amount indicating an usage amount of colorant to be used for the boundary determination region when the first converted image is printed;
   wherein the second condition further includes that the first object region and the second object region are detected and that the second estimated amount of colorant for the boundary determination region is greater than a threshold value corresponding to the boundary determination region;
   wherein the second color conversion using the second type of parameter is executed for at least one of the first object region and the second object region if the second condition is met.

5. The image processing device according to claim 4, wherein the computer-readable instructions, when executed by the processor, causes the image processing device to further perform:
   acquiring a first difference and a second difference when the second condition is met, the first difference being obtained by subtracting the first estimated amount of colorant for one determination region containing a part of the first object region from a threshold value corresponding to the one determination region, the second difference being obtained by subtracting the first estimated amount of colorant for another determination region containing a part of the second object region from the threshold value corresponding to the another determination region,
   wherein the second color conversion using the second type of parameter is executed for the first object region if the first difference is smaller than the second difference and the second condition is met,
   wherein the second color conversion using the second type of parameter is executed for the second object region if the second difference is smaller than the first difference and the second condition is met.

6. The image processing device according to claim 5, wherein the plurality of determination regions are defined so that each determination region partially overlaps with a determination region next to the each determination region, the boundary determination region overlapping the one determination region and the another determination region, the one determination region having an area ratio of the first object region higher than an area ratio of the first object region in the boundary determination region, the another determination region having an area ratio of the second object region higher than an area ratio of the second object region in the boundary determination region.

7. The image processing device according to claim 1, wherein the first estimated amount of colorant for each of the plurality of determination regions in the first converted image is determined based on the first converted image that is obtained by executing the first conversion for the at least part of the image by using the first parameter.

8. The image processing device according to claim 1, wherein the computer-readable instructions, when executed by the processor, causes the image processing device to further perform:
   determining, based on the second converted image, a second estimated amount of colorant for at least one determination region whose first estimated amount of colorant is greater than a threshold value corresponding to the at least one determination region, the second estimated amount indicating an usage amount of colorant to be used for the at least one determination region when the second converted image is printed;
   judging whether or not a third condition is met, the third condition including that the second estimated amount of colorant for the at least one determination region is smaller than or equal to the threshold value corresponding to the at least one determination region; and
   outputting the second converted image if the third condition is met.

9. The image processing device according to claim 1, wherein the second condition includes that the first estimated amount of colorant for one determination region of the plurality of determination regions is greater than a threshold value corresponding to the one determination region, the one determination region having a difference largest among differences of the plurality of determination regions, the difference of each determination region being obtained by subtracting a threshold value corresponding to the each determination region from the estimated amount of colorant for the each determination region.

10. The image processing device according to claim 1, wherein the plurality of determination regions are defined so that each determination region partially overlaps with a determination region next to the each determination region.

11. A non-transitory computer readable storage medium storing computer-readable instructions, when executed by a processor, causing an image processing device to perform:
   acquiring image data representing an image;
   defining a plurality of determination regions in at least part of the image based on the image data;
   executing, for the at least part of the image, a first color conversion using a first type of parameter to generate a first converted image, the first type of parameter defining relationships between usage amounts of colorant before and after the first color conversion;
   determining a first estimated amount of colorant for each of the plurality of determination regions in the first converted image, the first estimated amount indicating an usage amount of colorant to be used for each of the plurality of determination regions when the first converted image is printed;
   judging whether or not a first condition is met, the first condition including that the first estimated amounts of colorant for all of the plurality of determination regions is smaller than or equal to respective threshold values;
   outputting the first converted image if the first condition is met; and
   executing, for the at least part of the image, a second color conversion using a second type of parameter to generate a second converted image if a second condition is met, the second condition including that the first condition is not met, the second type of parameter defining relationships between usage amounts of colorant before and after the second color conversion, the usage amount of colorant for the at least part of the image that has been converted through the second color conversion using the second type of parameter being smaller than the usage amount of colorant for the at least part of the image that has been converted through the first color conversion using the first type of parameter.

* * * * *